(12) United States Patent
Han et al.

(10) Patent No.: US 11,800,394 B2
(45) Date of Patent: Oct. 24, 2023

(54) METHOD AND DEVICE FOR MANAGING NETWORK TRAFFIC IN WIRELESS COMMUNICATION SYSTEM

(71) Applicant: Samsung Electronics Co., Ltd., Suwon-si (KR)

(72) Inventors: Yoonseon Han, Suwon-si (KR); Sunghoon Kim, Suwon-si (KR); Jungshin Park, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 17/267,779

(22) PCT Filed: Aug. 12, 2019

(86) PCT No.: PCT/KR2019/010214
§ 371 (c)(1),
(2) Date: Feb. 10, 2021

(87) PCT Pub. No.: WO2020/032769
PCT Pub. Date: Feb. 13, 2020

(65) Prior Publication Data
US 2021/0329485 A1    Oct. 21, 2021

(30) Foreign Application Priority Data

Aug. 10, 2018  (KR) .................. 10-2018-0094001
May 2, 2019    (KR) .................. 10-2019-0051831

(51) Int. Cl.
  H04W 28/02    (2009.01)
  H04W 28/08    (2023.01)
  H04W 72/21    (2023.01)

(52) U.S. Cl.
  CPC ... *H04W 28/0236* (2013.01); *H04W 28/0858* (2020.05); *H04W 28/0967* (2020.05); *H04W 72/21* (2023.01)

(58) Field of Classification Search
  CPC ......... H04W 28/0236; H04W 28/0858; H04W 28/0967; H04W 72/0413; H04W 28/0215;
  (Continued)

(56) References Cited

U.S. PATENT DOCUMENTS

2017/0150420 A1   5/2017   Olsson et al.
2018/0192324 A1   7/2018   Bernini et al.
(Continued)

OTHER PUBLICATIONS

"3rd Generation Partnership Project Technical Specification Group Services and System Aspects; System Architecture for the 5G System; Stage 2", IEEE, 2018 (Year: 2018).*
(Continued)

*Primary Examiner* — Omer S Mian

(57) ABSTRACT

A method of generating an uplink classifier (UL CL) via a session management function (SMF) includes: requesting a network data connection and analysis function (NWDAF) to provide data related to the UL CL for controlling a flow of network traffic; receiving the data related to the UL CL from the NWDAF; selecting at least one of a plurality of user plane functions (UPFs) based on the received data related to the UL CL; and creating the UL CL in the selected at least one UPF.

11 Claims, 14 Drawing Sheets

(58) Field of Classification Search
CPC .. H04W 28/0247; H04W 40/04; H04W 28/02
See application file for complete search history.

(56) References Cited

U.S. PATENT DOCUMENTS

| | | | |
|---|---|---|---|
| 2019/0191330 A1* | 6/2019 | Dao | H04L 69/22 |
| 2021/0144063 A1* | 5/2021 | Abboud | H04W 48/18 |
| 2021/0235288 A1* | 7/2021 | Dao | H04W 72/1257 |

OTHER PUBLICATIONS

"3rd Generation Partnership Project; Technical Specification Group Services and System Aspects; System Architecture for the 5G System; Stage 2 (Release 15)", 3GPP TS 23.501 V15.2.0 (Jun. 2018), 216 pages.
"3rd Generation Partnership Project; Technical Specification Group Services and System Aspects; Procedures for the 5G System; Stage 2 (Release 15)", 3GPP TS 23.502 V15.2.0 (Jun. 2018), 308 pages.
"3rd Generation Partnership Project; Technical Specification Group Services and System Aspects; Policy and Charging Control Framework for the 5G System; Stage 2 (Release 15)", 3GPP TS 23.503 V15.2.0 (Jun. 2018), 67 pages.
Intel et al., "New solution: NWDAF Influence on traffic routing", 3GPP TSG SA WG2 Meeting #127, Apr. 16-20, 2018, S2-185169, 3 pages.
International Search Report dated Nov. 20, 2019 in connection with International Patent Application No. PCT/KR2019/010214, 2 pages.
Written Opinion of the International Searching Authority dated Nov. 20, 2019 in connection with International Patent Application No. PCT/KR2019/010214, 7 pages.

\* cited by examiner

METHOD AND DEVICE FOR MANAGING NETWORK TRAFFIC IN WIRELESS COMMUNICATION SYSTEM

CROSS-REFERENCE TO RELATED APPLICATIONS

This application is a 371 of International Application No. PCT/KR2019/010214 filed on Aug. 12, 2019, which claims priority to Korean Patent Application No. 10-2018-0094001 filed on Aug. 10, 2018 and Korean Patent Application No. 10-2019-0051831 filed on May 2, 2019, the disclosures of which are herein incorporated by reference in their entireties.

BACKGROUND

1. Field

The disclosure relates to a method and a device for managing network traffic in a wireless communication system.

2. Description of Related Art

To meet the increasing demand with respect to wireless data traffic after the commercialization of $4^{th}$ generation (4G) communication systems, efforts have been made to develop an advanced $5^{th}$ generation (5G) system or pre-5G communication system. For this reason, the 5G or pre-5G communication system is also called a beyond 4G network communication system or post long term evolution (LTE) system. The 5G communication system defined by $3^{rd}$ Generation Partnership Project (3GPP) is called a new radio (NR) system. In order to achieve a high data rate, implementation of the 5G communication system in ultra-high frequency millimeter wave (mmWave) bands, e.g., 60 GHz bands, is being considered. To reduce propagation loss of radio waves and to increase a transmission range of radio waves in the ultra-high frequency bands, technologies such as beamforming, massive multiple-input multiple-output (MIMO), full dimensional MIMO (FD-MIMO), array antenna, analog beamforming, and large-scale antennas are under discussion and applied to the NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed for the 5G communication system. In addition, for the 5G system, an advanced coding modulation (ACM), e.g., hybrid frequency-shift keying (FSK) and quadrature amplitude modulation (QAM) modulation (FQAM), and sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-centered connectivity network where humans generate and consume information to an Internet of Things (IoT) network where distributed entities or things send, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, technologies for a sensor network, machine to machine (M2M) communication, and machine type communication (MTC) for connection between things are being studied. Such an IoT environment may provide intelligent Internet Technology (IT) services that create new value in human life by collecting and analyzing data generated among connected things. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M communication, MTC, etc., are implemented by the 5G communication technologies, such as beamforming, MIMO, array antenna schemes, etc. Even application of a cloud radio access network (cloud RAN) as the aforementioned big data processing technology may be said to be an example of convergence of 5G and IoT technologies.

As various services can be provided with the development of the aforementioned technologies and mobile communication systems, there is a demand for a method of effectively providing the services.

Provided are a method and a device for managing network traffic in a wireless communication system.

SUMMARY

According to an embodiment of the disclosure, a method, performed by a session management function (SMF), of generating an uplink classifier (UL CL) includes: requesting a network data connection and analysis function (NWDAF) to provide data related to the UL CL for controlling a flow of network traffic; receiving the data related to the UL CL from the NWDAF; selecting at least one of a plurality of user plane functions (UPFs) based on the received data related to the UL CL; and inserting the UL CL in the selected at least one UPF.

The requesting the NWDAF to provide the data related to the UL CL may include transmitting a request message including parameter data for requesting the data related to the UL CL from data collected by the NWDAF. Also, the parameter data may be related to at least one of data related to a predetermined event, data about an analysis object related to at least one entity in a network, or request data.

The data related to the UL CL may include at least one of network data, traffic data, service quality data, packet data, or data session data.

The data related to the UL CL may include at least one of recommendation data for inserting the UL CL, data about time required for applying the recommendation data, information data, or requirement data, and the selecting of the at least one of the plurality of UPFs may include selecting the at least one of the plurality of UPFs based on the recommendation data.

The method of generating the UL CL via the SMF may further include: selecting a first UPF to remove from the at least one UPF in which the UL CL is created based on the received data related to the UL CL according to a change in the flow of the network traffic; and transmitting and receiving data that is transmitted and received through the first UPF, through a second UPF from among the at least one UPF in which the UL CL is created.

The method may further include transmitting and receiving data through a first UPF from among the plurality of UPFs, and the creating of the UL CL may further include: determining whether or not it is required to divert a traffic load, based on traffic data of the first UPF in the received data related to the UL CL; creating a UL CL in a second UPF from among the plurality of UPFs in order to divert the traffic load to the second UPF, based on a result of the determining; and transmitting and receiving at least a part of the data through the second UPF by using the UL CL created in the second UPF.

According to another embodiment of the disclosure, an operating method of a network data connection and analysis function (NWDAF) includes: collecting data from a user equipment (UE) or at least one of entities in a network; receiving, from a session management function (SMF), parameter data requesting data related to an uplink classifier (UL CL) for controlling a flow of network traffic from the collected data; analyzing the data related to the UL CL based on the received data; and providing the analyzed data to the SMF.

The parameter data may be related to at least one of data related to a predetermined event for filtering, data about an analysis object including the at least one of the entities in the network, or request data.

The data related to the UL CL may include at least one of network data, traffic data, service quality data, packet data, or data session data. Also, the analyzing of the data related to the UL CL may include analyzing a quality of service provided through a user plane function (UPF) that is the at least one of the entities in the network, by analyzing, based on traffic reported from the UPF, at least one of a delay, an error rate, or a round trip time (RTT) of the traffic.

The analyzing of the data related to the UL CL may include determining whether or not to insert the UL CL based on the received data, and the analyzed data may include recommendation data for recommending a selection of a UPF for inserting the UL CL based on a result of the determining.

According to an embodiment of the disclosure, a session management function (SMF) for creating an uplink classifier (UL CL) includes: a transceiver; and at least one processor connected to the transceiver, wherein the at least one processor is configured to request data related to the UL CL for controlling a flow of network traffic from a network data connection and analysis function (NWDAF), receive data related to the UL CL from the NWDAF, select at least one of a plurality of user plane functions (UPFs) based on the received data related to the UL CL, and insert the UL CL in the selected at least one UPF.

The at least one processor may be further configured to transmit a request message including parameter data for requesting the data related to the UL CL from data collected by the NWDAF. Also, the parameter data may be related to at least one of data related to a predetermined event, data about an analysis object related to at least one entity in a network, or request data.

The data related to the UL CL may include at least one of network data, traffic data, service quality data, packet data, or data session data.

The data related to the UL CL may include at least one of recommendation data for inserting the UL CL, data about time required for applying the recommendation data, information data, or requirement data. Also, the at least one processor may be further configured to select at least one of the plurality of UPFs based on the recommendation information.

According to an embodiment of the disclosure, a network data connection and analysis function (NWDAF) for providing data related to an uplink classifier (UL CL) includes: a transceiver; and at least one processor connected to the transceiver, wherein the at least one processor is configured to: collect data from a user equipment (UE) or at least one of entities in a network; receive, from a session management function (SMF), parameter data requesting the data related to the UL CL for controlling a flow of network traffic from the collected data; analyze the data related to the UL CL based on the received data; and provide the analyzed data to the SMF.

DETAILED DESCRIPTION

Figure 1:
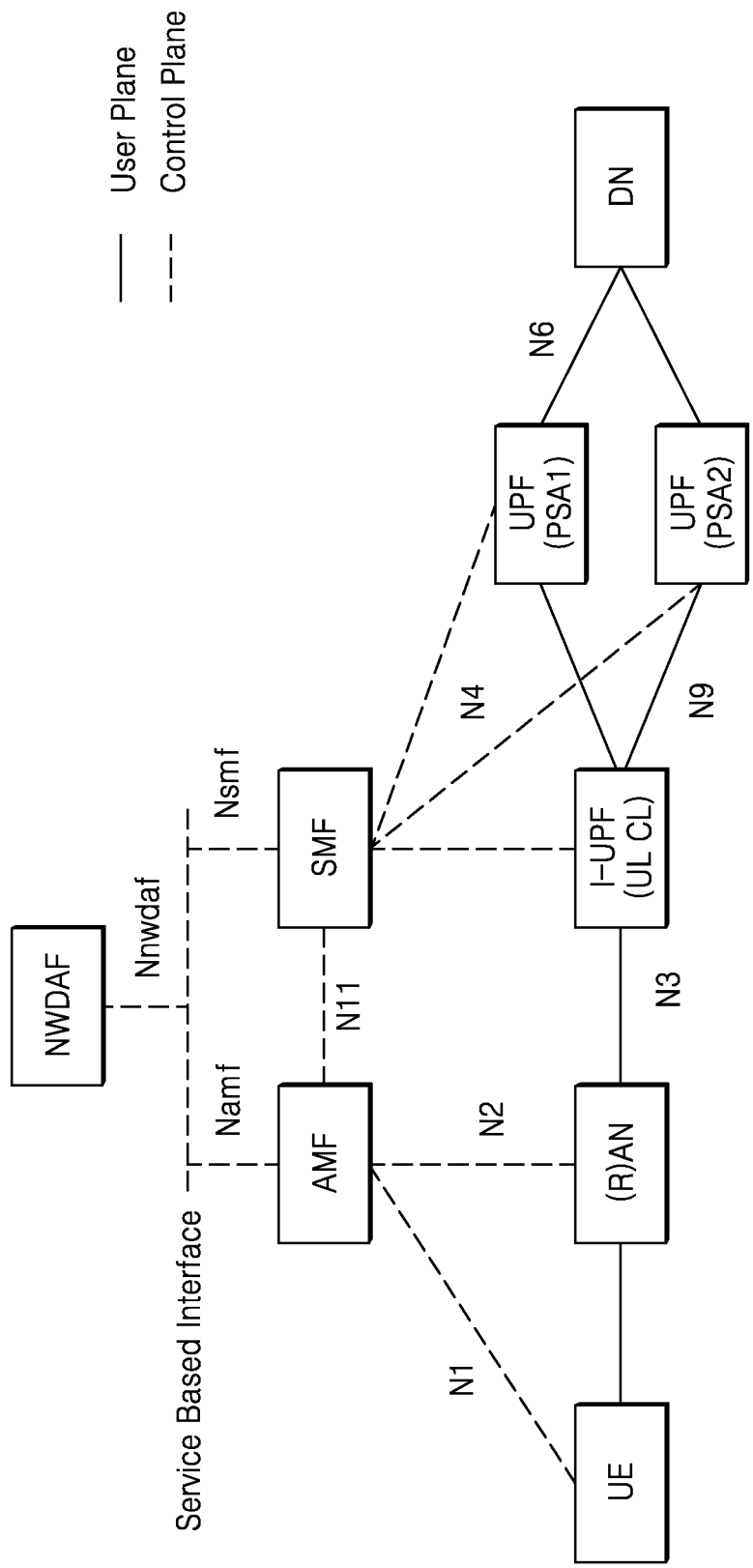
FIG. 1 is a diagram illustrating a logical correlation among entities, according to an embodiment of the disclosure.

Hereinafter, embodiments of the disclosure are described in detail with reference to the accompanying drawings.

When describing the embodiments, technical aspects that are well-known in the art and are not directly related to the disclosure are not described. By omitting unnecessary descriptions, the gist of the disclosure may not be obscured and may be relatively more clearly conveyed.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments of the disclosure are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of blocks in processing flowcharts may be implemented by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instructions for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

The term "~unit" as used herein refers to a software or hardware component, such as field programmable gate array (FPGA) or application specific integrated circuit (ASIC), which performs some functions. However, "~unit" is not limited to software or hardware. The term "~unit" may be configured to be stored in an addressable storage medium, or to execute one or more processors. For example, "~unit" may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and "~units" may be combined into fewer components and "~units", or further divided into additional components and "~units". Moreover, the components and "~units" may be implemented to execute one or more central processing units (CPUs) in a device or security multimedia card. In embodiments of the disclosure, a "~unit" may include one or more processors.

When specifically describing embodiments of the disclosure, a wireless access network, that is, a new radio (NR) access network (RAN), and a core network, that is, a packet core (a 5G system, a 5G core network, or a next generation (NG) core), specified by the $3^{rd}$ generation partnership project (3GPP), which is a mobile communication standardization group, are mainly described. However, with slight modifications, the gist of the disclosure may be applied to other communication systems having similar technical backgrounds within a range not greatly deviating from the scope of the disclosure, which could be understood by one of ordinary skill in the art.

In a 5G system, to support network automation, a network data collection and an analysis function (NWDAF) to analyze and provide data collected in a 5G network may be defined. The NWDAF may collect/store/analyze data from a 5G network and provide the result to unspecified network functions (NFs). The analysis result may be independently used by each NF.

Below, for convenience of descriptions, the terms and names defined by the 3GPP standards (5G, NR, LTE, or similar system standards) may be partly used. However, the disclosure is not limited to these terms and names. The disclosure may be equally applied to systems according to other standards.

Also, terms used in the descriptions below, such as a term to identify a connection node, a term to refer to network entities, a term to refer to messages, a term to refer to an interface between the network entities, and a term to refer to various identification information, are merely examples given for convenience of descriptions. Thus, the disclosure is not limited to these terms, and other terms may be used to refer to objects having like technical meanings.

The disclosure provides a method of using a packet data unit (PDU) session in a 5G mobile communication system, whereby a session management function (SMF) requests analysis data required for session management, from an NWDAF, and manages the PDU session by using the analysis data.

The 5G mobile communication system may support a method, whereby NFs may collect network-related data through an NWDAF and use an analysis result. Via this method, the collection and the analysis of the network data may be performed in a focused fashion, and thus, each NF may effectively provide its function. The NWDAF may perform the collection and the analysis of the network data for each network slice. However, the scope of the disclosure is not limited to the network slice unit, and the NWDAF may additionally use various data, such as user equipment (UE), a PDU session, an NF status, the quality of service obtained from an external service server, etc. The result of the analysis of the NWDAF may be transmitted to each NF requesting the result, and the transmitted analysis result may be used to optimize the network management functions, such as securing/improving quality of service (QoS), traffic controlling, mobility maintenance, load diversion, etc.

The disclosure relates to a method, whereby an SMF uses the data collected and analyzed by the NWDAF to efficiently manage the PDU session. In the 5G mobile communication system, the SMF refers to a network function to manage a session of data transmitted or received to or from a user equipment (UE). The SMF may provide a plurality of functions, such as inserting/changing/removing a session, assigning/managing an IP address of a UE, a dynamic host configuration protocol (DHCP) function, an address resolution protocol (ARP) proxy function, selecting and controlling a user plane function (UPF), controlling traffic of the UPF, a charging-related function, notifying down data, and the like.

The disclosure provides a method of using an NWDAF in order to increase the efficiency of selecting and controlling double UPFs and controlling UPF traffic.

Currently, in the 3GPP, a core network of the 5G mobile communication may provide a PDU connectivity service that supports data communication between a UE and a data network, wherein the data communication may be managed by a PDU session created for each UE.

In the 5G mobile communication, the PDU session may transmit data units of IPv4, IPv6, IPv4v6, and Ethernet, and an unstructured data unit. Two end points of the PDU session may be the UPF directly connected to the UE and a data network (DN). Here, the UPF included in the end points may include a PDU session anchor (PSA).

In the case of an uplink, the UE may transmit data to an end point UPF including the PSA, through a base station and intermediate UPFs, and the end point UPF may transmit the transmitted data to an external network.

In the case of a downlink, a similar process may occur in a reverse order, and an additional process of finding and waking the UE may be performed. Here, the DN located at the outside of the core network of the mobile communication may regard an object communicating with the DN as the UPF including the PSA. The PSA may have an address which may be routed via an external network assigned for each UE, and this address may be different from an internal address of the UE, the internal address being assigned for routing via an internal network. Here, the conversion between the external address and the internal address may be performed by using a method, such as network address translation (NAT).

In general, a PDU session for each UE may generally have a single PSA for a predetermined DN. However, 5G supports a method by which data can be simultaneously transmitted to the DN via a plurality of PSAs on a PDU session. This function may be referred to as an uplink classifier (UL CL). In general, the UL CL may be applied in the mobile communication structure.

The UL CL is one of the functions provided by the UPF, and the insertion/removal and the control of the UL CL may be determined by the SMF. The UL CL may be located on a path through which network traffic transmitted by the UE reaches the DN. The traffic may be classified according to a filtering rule that is intrinsically owned by the UL CL, and the classified traffic may be transmitted to the DN through each different path.

Here, the DN may be the same as a DN that is transmitted before divergence. However, the PSA located at an end point of a path diverging through the UL CL may be different. That is, the traffic toward the same DN may be transmitted via the UL CL selecting one of multiple paths. The insertion of the UL CL may be simultaneously performed with the creation of the PDU session. However, it is not limited thereto, and the insertion of the UL CL may be performed after the creation of the PDU session.

In the case of the transmission through a downlink, packets received by a plurality of PSAs may be transmitted to the UL CL, the received packets may be merged and transmitted to the UE, and the separated/merged packets may be controlled by the SMF. When multiple PSAs are activated, the UPF may create a filter to classify the traffic in the UL CL, in order to identify the traffic toward each PSA. Here, a representative factor included in the filter may include a destination address or a prefix of an address.

The traffic that is classified by the filter may be transmitted to the DN through each different route according to an additional routing rule. An address of only one PSA from among PSAs that are simultaneously created may be transmitted to the UE. Also, the traffic may be separated by the UL CL, and thus, the transmission may not affect the behavior of the UE or the base station.

Entities in the disclosure are described below.

A unit performing each of functions provided by a 5G network system may be defined as a network function (NF). Representative NFs may include, for example, an access and mobility management function (AMF) configured to manage network access and the mobility of a UE, an SMF configured to perform functions related to a session, a UPF configured to manage a user data plane, a network slice selection function (NSSF) configured to select a network slice instance which may be available to a predetermined UE, an application function (AF) configured to efficiently provide services, etc. However, the NFs are not limited to the examples described above.

Moreover, there may be an NWDAF, which is an NF configured to collect and analyze data. The NWDAF may analyze data collected from a network or an external environment and provide the analyzed data to the NF. The NWDAF may collect the data from operation, administration, and maintenance (OAM), an NF included in a 5G network, or an AF. The NWDAF may collect the data by using various methods. The NWDAF may collect and analyze load levels of network slice instances and provide analysis results to the NSSF to select a network slice instance to be used by a particular UE.

Here, in order to request analysis data or transmit an analysis result value between a particular NF and the NWDAF, a service-based interface defined for the 5G network may be used, and as a transmission scheme, HTTP or JSON format document may be used.

In the 5G network, the NWDAF, which provides the function of collecting and analyzing data, may provide the services below. However, the services are not limited to the examples below.

A correlation among entities according to an embodiment of the disclosure is illustrated in FIG. 1.

FIG. 1 is a diagram illustrating a logical correlation among entities, according to an embodiment of the disclosure.

In the disclosure, a data network name (DNN) may be used as a factor to identify a DN. Here, when DNs are physically different networks but have the same DNN, the DNs may be regarded to be logically equal to each other. There may be a case where DNNs are same but data network access identifiers (DNAI) are different. For example, the case may include a network that is activated only in a predetermined region to accomplish a predetermined purpose, such as a local area data network (LADN), or a local network that is established in order to manage or improve the network performance.

Figure 2:
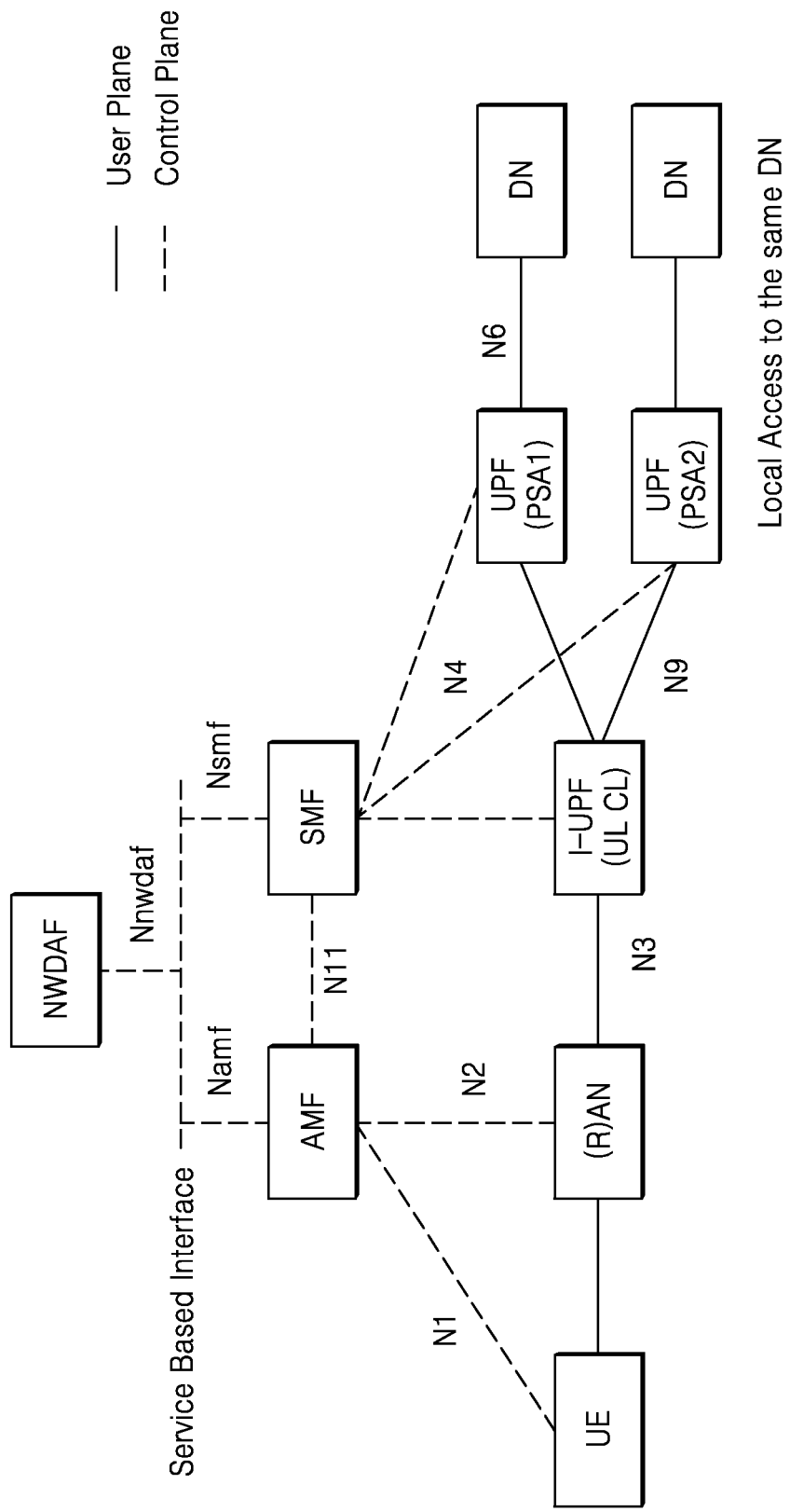
FIG. 2 is a diagram illustrating a logical correlation among entities in a case where local access is possible, according to an embodiment of the disclosure.

Accordingly, FIG. 2 illustrates a case where logically-equal services are available through physically different paths.

FIG. 2 is a diagram illustrating a logical correlation among entities in a case where local access is possible, according to an embodiment of the disclosure.

According to an embodiment of the disclosure, an NWDAF may collect network data from NFs and analyze the network data. The NWDAF may collect and analyze network-related data, service-related data, and UE-related data.

According to an embodiment of the disclosure, representative data having the purpose of traffic management using a UL CL may be used. However, the used data and the method of analysis are not necessarily limited thereto.

According to an embodiment of the disclosure, representative data that is collected may include application ID from a point coordination function (PCF), IP filter data, a media/application bandwidth, a UE identifier from an AMF, location data, a destination DNN from an SMF, a UE IP, a QoS flow bit rate, QFI, a QoS flow error rate, a QoS flow delay, traffic usage data from a UPF, etc. The traffic usage data from the UPF may be transmitted to the NWDAF from the SMF having received the data from the UPF.

The NWDAF may additionally collect data, such as a current resource situation (CPU, memory, I/O, etc.) of each NF from OAM, which is an entity to affect connectivity between the UE and a service server, in addition to the NF included in the core network of the 5G, a throughput of each NF and a connection link, service level agreement (SLA) information, UE status information from the UE, application information, usage pattern information, an application identifier of a service provided by an AF, the quality of service, a traffic pattern, etc., and may use the data for analysis.

This collected representative data may include data collected by the NWDAF from the NF, shown in [Table 1], and data collected by the NWDAF from an external entity, shown in [Table 2]. The content of [Table 2] may correspond to data collected from an entity, except for a core network.

When collecting the data described above, a period and a time point for collecting the data from each entity may vary. In addition, a correlation between collected data may be identified, based on correlation ID for mapping the data collected from each object and through a timestamp for recording the time point at which the data is collected. Based on the correlation, the collected data may be additionally classified, in more detail, into a predetermined UE, a predetermined UE group, a predetermined service, a predetermined location, etc.

TABLE 1

Data collected by the NWDAF from the NF

| Collected Data | Object of Collection | Description |
| --- | --- | --- |
| Application ID | PCF | ID received from the AF and used to identify a service provider of an application and the QoS Flow to be applied |
| IP Filter Information | PCF | Data received from the AF and used to identify a service data flow transmitted to a predetermined service |

TABLE 1-continued

Data collected by the NWDAF from the NF

| Collected Data | Object of Collection | Description |
| --- | --- | --- |
| (Media/Application Bandwidth) | PCF | Data received from the AF and bandwidth requirements required by media/application |
| Location Information | AMF | Current Location Information |
| Data Network Name | SMF/PCF | Name of a network providing a service |
| QoS Flow ID (QFI) | SMF/PCF | QoS Flow ID |
| QoS Flow Bit Rate | SMF | Guaranteed flow bit rate (GFBR) of the QoS flow/maximum flow bit rate (MFBR) data |
| QoS Flow Packet Delay | SMF | Delay information of a QoS flow packet |
| QoS Flow Packet Error Rate | SMF | Error rate Information of a QoS flow packet |
| Traffic Usage Report | UPF/SMF | Traffic usage Information for each UE |

TABLE 2

Data collected by the NWADF from the external entity

| Collected Data | Object of Collection | Description |
| --- | --- | --- |
| NF Resource Status | OAM | A status of a resource currently used by the NF and an occupancy ratio against a maximum value Objects of the resource may include a CPU, a memory, and I/O (including a network) |
| NF throughput | OAM | A service processing status of the NF and a maximum value An indication method of the processing capacity is different based on the purpose of each NF |
| SAL Information | OAM | Contract relation information to be provided to a predetermined service |
| UE Status Information | UE | Information about a type and a status of the UE Typically including status information, such as battery Information and information about a connectivity status of an external network |
| UE Application Information | UE | A status of an application program installed or used in the UE |
| UE Usage Pattern | UE | Information about the usage pattern of the UE. Information identified by the UE and not limited to network-related Information Time for performing a predetermined application, a frequency and a period for using the UE, and the like may be typically included |
| Application ID | AF | ID information for identification from an application provided from another AF |

TABLE 2-continued

Data collected by the NWADF from the external entity

| Collected Data | Object of Collection | Description |
| --- | --- | --- |
| Service Experience | AF | A current Level of the service quality evaluated by an actual user or a service identifier A representative example includes a value of mean opinion service (MOS) |
| Traffic Pattern | AF | A traffic pattern designed when an application or a service is developed |

The NWDAF having collected the data described above may analyze the data, by using the data, for each service, each DNN, each UE group when there are a plurality of UE groups, each UE, each region, each NF, and each traffic route.

The network data that is primarily analyzed may be information directly related to the traffic. For example, a flow duration, a volume, a packet inter arrival time, burstiness (an amount of traffic transmitted during a short period of time), an average packet size, a traffic tendency (a rise/fall state and an increase and a decrease), load information of an NF/route/slice, round trip time (RTT) of a predetermined UPF, etc. may be analyzed. Based on the analyzed data, a load level of a predetermined network route and a predetermined entity, and a load level of a predetermined future time zone may be estimated and analyzed.

Also, a probability of a breakdown of a predetermined NF, a probability of an occurrence of congestion or disorder on a predetermined route, whether or not an SLA is infringed, a probability of the SLA infringement, service end time, and whether or not a handover to a predetermined region occurs and its probability may be analyzed.

That is, the final form of the analyzed data may have the purpose of calculating a path through which the packet is to be transmitted from the UE to a destination DN and calculating the information created by mapping network resources to be assigned to the path Entities existing on the path and information about the problems which may directly occur on the path may be analyzed and predicted.

Figure 3:
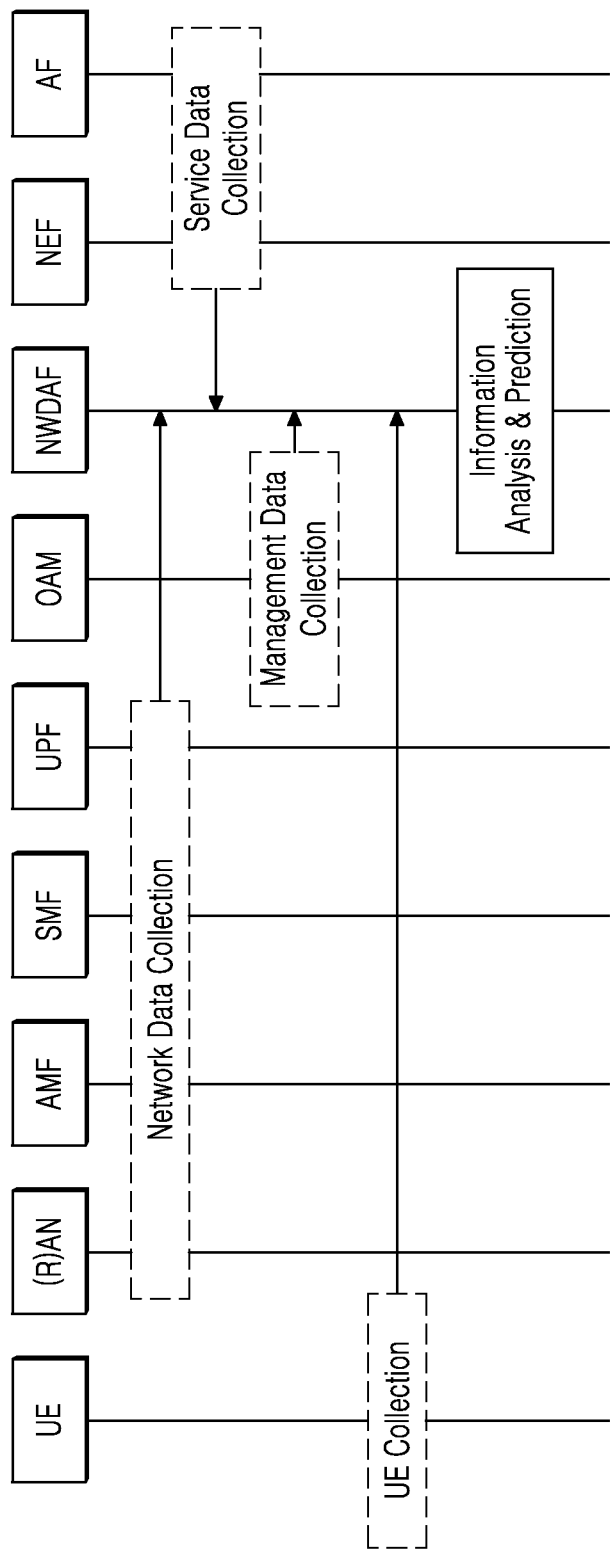
FIG. 3 is a conceptual diagram of a process of collecting and analyzing data of entities, performed by a network data connection and analysis function (NWDAF), according to an embodiment of the disclosure.

FIG. 3 illustrates a process of collecting and analyzing the data described above.

FIG. 3 is a conceptual diagram of a process in which an NWDAF collects and analyzes data of an entity, according to an embodiment of the disclosure.

For every route existing between a predetermined UE or a base station and a predetermined DNN, the traffic situation, whether or not the SLA is infringed, the load information, and analysis information of a delay and error extent may be analyzed, and a prediction value with respect to a future situation may be obtained. These values may be used in embodiments of the disclosure to be described below.

According to an embodiment of the disclosure, the network analysis and prediction information obtained through the process described above may be used, and a UL CL function provided by an UPF with respect to the traffic toward the same DN may be used. Thus, without an operation, such as a UE configuration or a session movement, the network traffic may be efficiently managed.

The data collected and analyzed by the NWDAF may be transmitted to the SMF. The SMF may internally establish a processing method, and then, the SMF may separate or merge predetermined network traffics for the purpose of one or more embodiments, by using the UL CL function provided by the UPF. Through this operation, the network traffic and the resources may be effectively managed.

In a 5G mobile communication network of 3GPP, an execution of the execution function, such as the insertion and removal of the UL CL, may be performed by an SMF.

The NWDAF may provide the analysis data to the SMF so that the SMF may effectively execute the UL CL. Here, the UL CL-related information may be transmitted and received between the SMF and the NWDAF, by mainly using two methods.

First, the NWDAF may provide only the analysis data. The NWDAF may directly transmit the analysis data to the SMF. The SMF may directly perform an additional analyzing operation and determine a method of managing the UL CL. The SMF may indicate the UPF to insert/change/remove the UL CL.

Second, the NWDAF may provide a UL CL-related recommended configuration parameter to the SMF.

Figure 4:
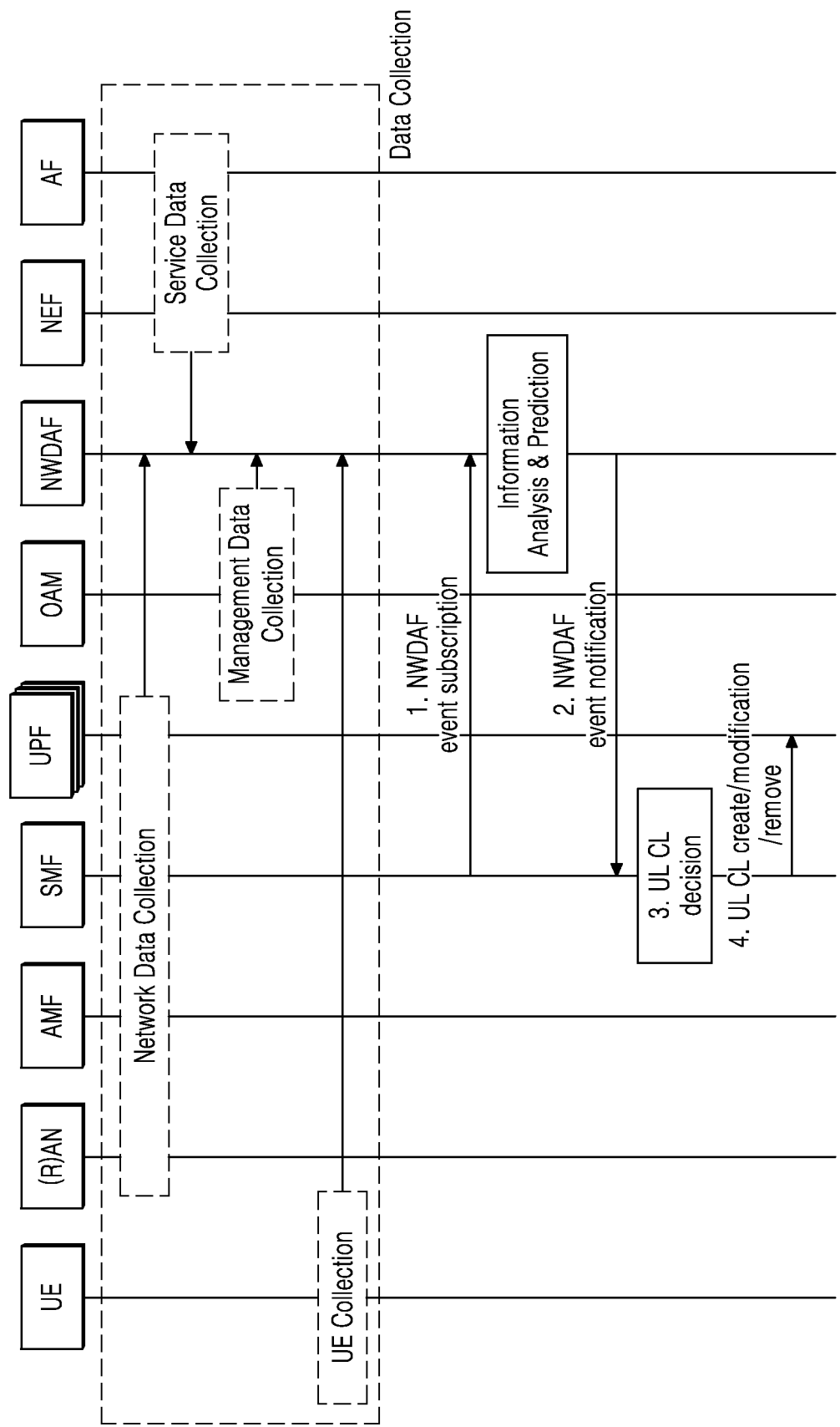
FIG. 4 is a diagram for describing a process of controlling an uplink classifier (UL CL) via subscription/notification with respect to NWDAF analysis data, the process being performed by a session management function (SMF), according to an embodiment of the disclosure.

A method performed by the SMF to use the analysis data from the NWDAF to apply the UL CL is illustrated in FIG. 4.

FIG. 4 is a diagram for describing a process in which an SMF controls a UL CL via subscription/notification of analysis data of an NWDAF, according to an embodiment of the disclosure.

The NWDAF may provide analysis data by collecting and analyzing data from each NF and external entities. Here, the collection and the analysis of required data may be started to be performed from a time point in which the SMF requests a subscription to traffic-related data.

According to an embodiment of the disclosure, the first operation of FIG. 4 may correspond to an operation in which the SMF requests a subscription to the UC CL-related analysis data from the NWDAF and may be performed via an Nnwdaf_EventsSubscription_Subscribe interface. Factors transmitted in a request message may include analysis data objects (a predetermined slice, a DNN, a predetermined route, a predetermined UE group, a predetermined NF), requested analysis data, event data receiving objects, event subscription-related factors (a mode, the number of reports, a report period), an event filter (an event notification condition), etc.

In response to this request, the NWDAF may return subscription correlation ID with respect to the current subscription.

Here, the requested data may include a flow duration, a volume, a packet inter arrival time, burstiness (an amount of traffic transmitted during a short period of time), an average packet size, a traffic tendency (a rise/fall state and an increase and a decrease), load information of an NF/route/slice, RTT of a predetermined UPF, a probability of a breakdown of a predetermined NF, a probability of an occurrence of congestion or disorder on a predetermined route, whether or not an SLA is infringed, a probability of the SLA infringement, service end time, and whether or not a handover to a predetermined region occurs and its probability, as described above with respect to the analysis process. Other additional information may be requested and used by the SMF.

According to an embodiment of the disclosure, the second operation of FIG. 4, that is, the notification of the analysis data, may correspond to an operation of periodically transmitting the analysis data from the NWDAF to the SMF in response to the request of the SMF or transmitting the analysis data when a predetermined condition is met. The NWDAF may transmit event ID, a notification object address, an analysis object, and the analysis data to the SMF.

According to an embodiment of the disclosure, the third operation of FIG. 4 may correspond to an operation of determining, via the SMF having received the analysis data, whether or not to insert/change/remove the UL CL in a predetermined UPF, based on an intrinsic operating method. The intrinsic operation method of the SMF may vary according to a manufacturing company. According to an embodiment of the disclosure, the SMF may perform a predetermined UL CL-related operation when a predetermined threshold value is received. According to an embodiment of the disclosure, according to a purpose, an algorithm for calculating optimized states (for example, a low maximum link usage rate, a least energy usage, the minimum number of pieces of pre-text, etc.) may be adopted.

According to an embodiment of the disclosure, the fourth operation of FIG. 4 may correspond to an operation of determining a configuration of the UL CL through an intrinsic algorithm and changing configurations of the UL CL and related UPFs through an N4 interface according to the process of inserting/changing/removing the UL CL. Here, the SMF may transmit a traffic filtering rule about which traffic is to be transmitted through which route. The traffic filtering rule may include a method of classifying the traffic, the method applying the rule, and an output route. The traffic classification method may include a combination of a transmitting address, a prefix of the transmitting address, a destination address, a prefix of the destination address, a DNN, etc. The output route may vary according to networks. For example, the output route may include an output port, a next UPF, tunnel selection, etc.

Figure 5:
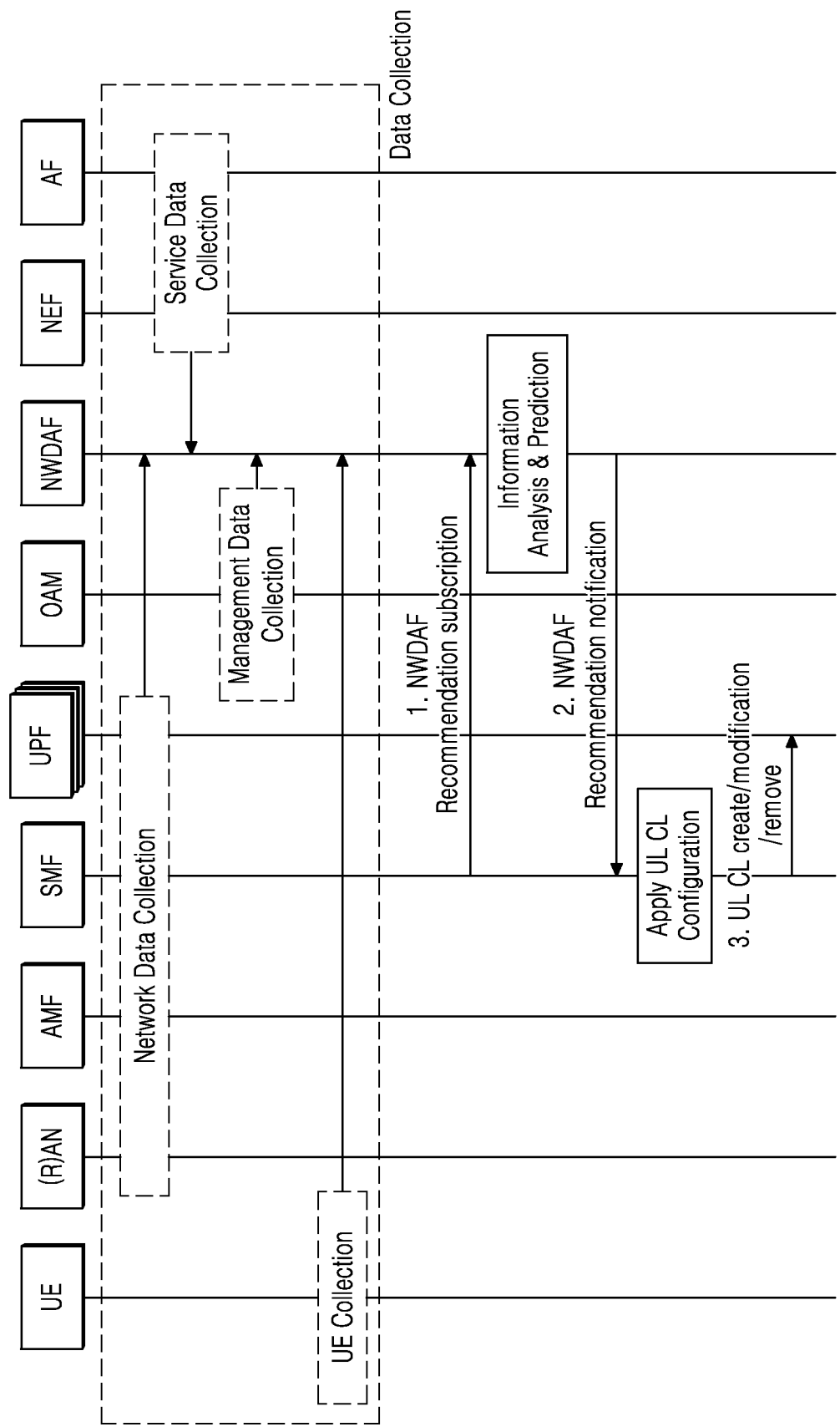
FIG. 5 is a diagram for describing a process of controlling a UL CL via subscription/notification with respect to a configuration value recommended by an NWDAF, the process being performed by an SMF, according to an embodiment of the disclosure.

FIG. 5 is a diagram for describing a process in which the SMF controls the UL CL via subscription/notification of an NWDAF-recommended configuration value, according to an embodiment of the disclosure.

In detail, FIG. 5 is the diagram for describing a method of managing the UL CL via the NWDAF providing a recommended configuration value to the SMF, according to an embodiment of the disclosure.

According to an embodiment of the disclosure, a first operation of FIG. 5 may correspond to an operation in which the SMF may transmit, to the NWDAF, a request for subscribing to a recommended configuration value by using an Nnwdaf_Recommendation_Subscribe interface. A subscription request message may internally include an object indicating a request for a required UL CL-related configuration value. Additionally, a required time period for the application of the configuration value, a period of data collection and analysis, and additional requirements may be transmitted together. Thus, between the NWDAF and the SMF, the UL CL-related configuration value and a method of obtaining the same via the SMF may be internally realized.

According to an embodiment of the disclosure, a second operation of FIG. 5 may be performed when the NWDAF determines that it is required to perform an operation of inserting/changing/removing the UL CL. In the second operation of FIG. 5, a point in time for a notification and content of the notification may be determined by considering the configuration value and the requirements requested in the first operation.

According to an embodiment of the disclosure, a third operation of FIG. 5 may correspond to applying a change to the UL CL according to a process by using the recommended configuration value received from the NWDAF.

Between the second operation and the third operation, an operation in which the SMF examines whether or not to apply the recommended value of the NWDAF may further be included.

The examples described with reference to FIGS. 4 and 5 correspond the methods via the subscription, and when the SMF meets a predetermined condition, the SMF may request, from the NWDAF, the analysis information or the recommended configuration value. When comparing the method via the subscription and the notification between the SMF and the NWDAF with an embodiment of the disclosure, factors transmitted and received between the SMF and the NWDAF may be similar as each other, but the method and the embodiment may differ from each other in that the NWDAF interface that is used may use a request/response. In addition, an embodiment of the disclosure may be different from the previous method in that monitoring of the time point for the application of the UL CL may be directly performed by the SMF.

Figure 6:
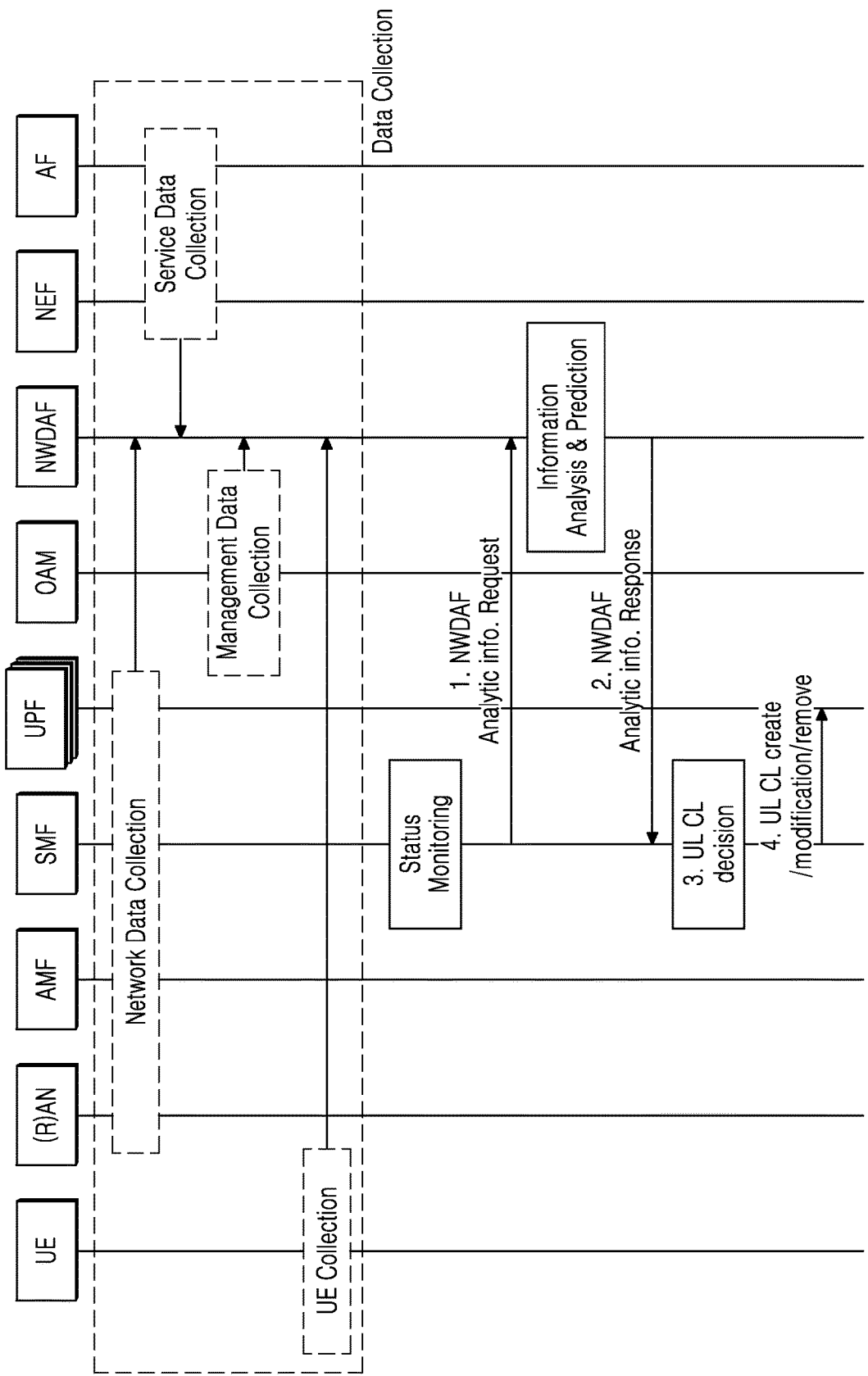
FIG. 6 is a diagram for describing a process of controlling a UL CL via a request/response with respect to NWDAF analysis data, the process being performed by an SMF, according to an embodiment of the disclosure.

A process of the case where the analysis information may be directly used by the SMF is illustrated in FIG. 6.

FIG. 6 is a diagram for describing a process in which the SMF controls the UL CL via a request/response with respect to the analysis data of the NWDAF, according to an embodiment of the disclosure.

Figure 7:
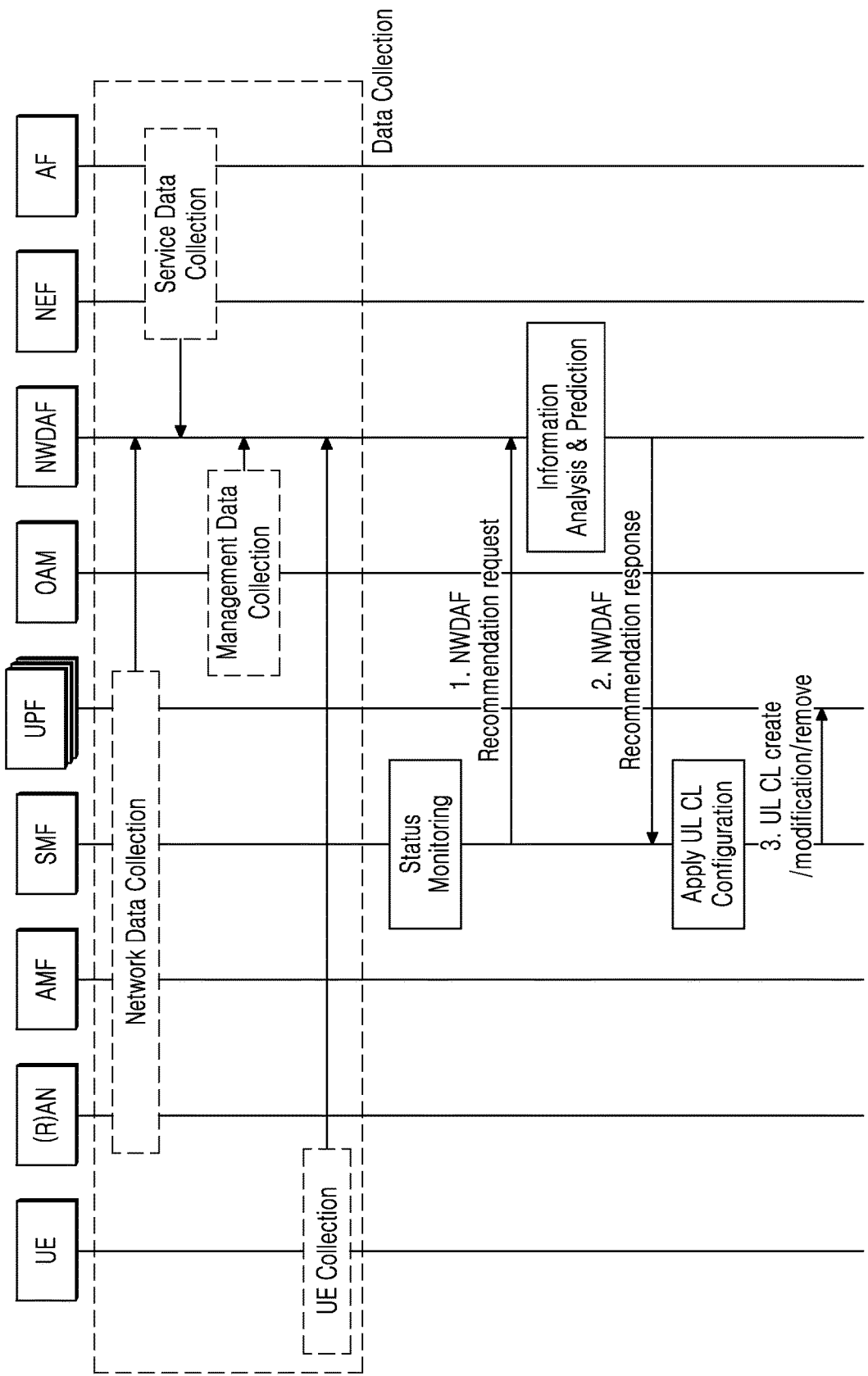
FIG. 7 is a diagram for describing a process of controlling a UL CL via a request/response with respect to a configuration value recommended by an NWDAF, the process being performed by an SMF, according to an embodiment of the disclosure.

A process of the case where the SMF receives the recommended configuration value from the NWDAF is illustrated in FIG. 7.

FIG. 7 is a diagram for describing a process in which the SMF controls the UL CL via a request/response with respect to the NWDAF-recommended configuration value, according to an embodiment of the disclosure.

Hereinafter, a method of applying the UL CL for diverting a network load by using the analysis data of the NWDAF will be described.

A mobile communication network may refer to a system in which a plurality of users simultaneously receive services. In this case, the traffic may be concentrated on a predetermined DN, and thus, an overload may occur to an NF or a network link located on the route. To solve the occurrence of the overload, the load may be diverted by selecting another route that is currently not busy. A process in which the SMF inserts the UL CL by using the analysis data of the NWDAF for diverting the load is illustrated in FIG. 8.

Figure 8:
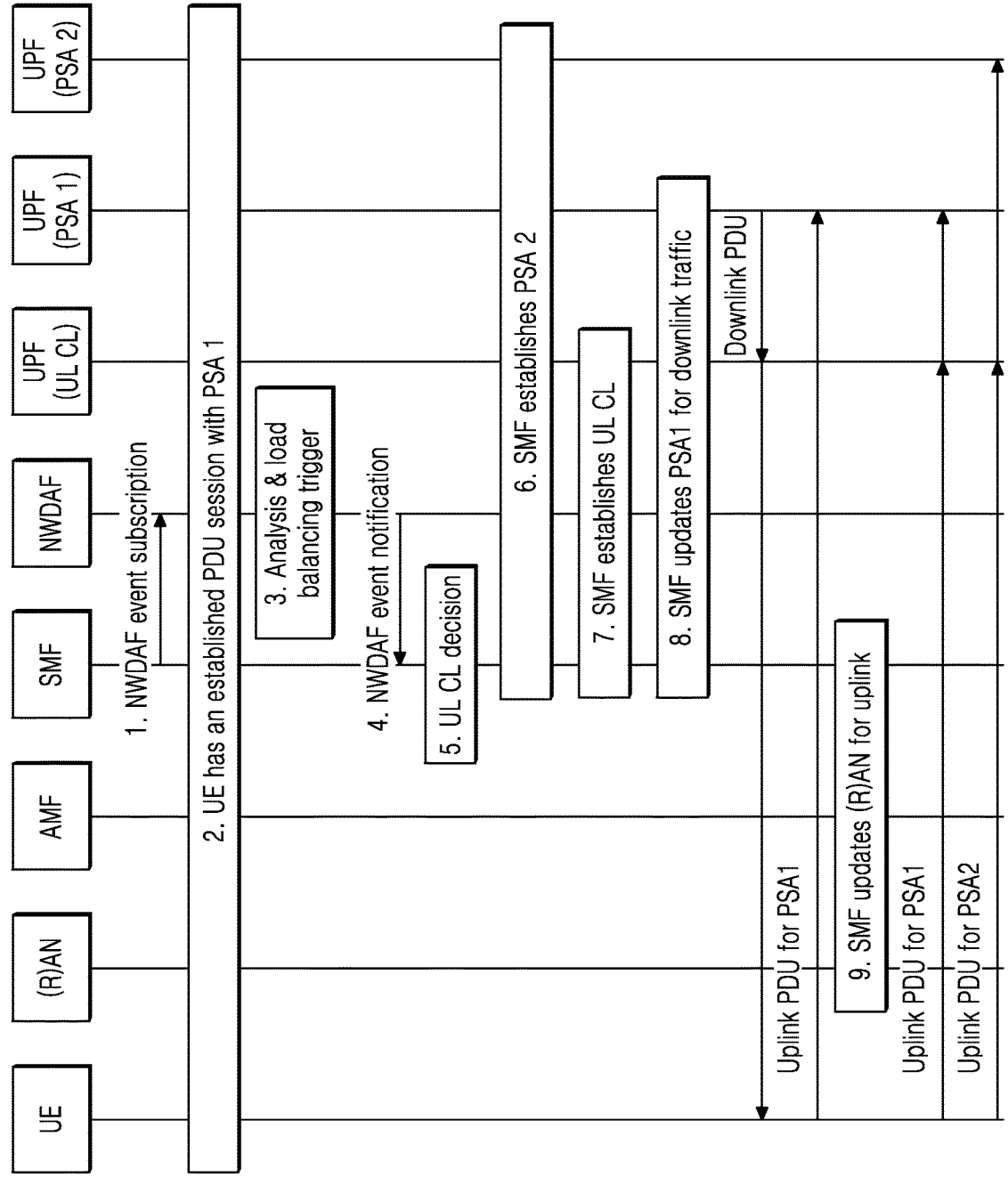
FIG. 8 is a diagram for describing a method performed by an SMF to divert a load by using NWDAF analysis data, according to an embodiment of the disclosure.

FIG. 8 is a diagram for describing a method performed by the SMF to divert a load by using the analysis data of the NWDAF, according to an embodiment of the disclosure.

In detail, FIG. 8 is a diagram for describing a process in which a UPF (PSA 2) is additionally assigned to divert the load, in a situation where a UE transmits and receives data traffic through a UPF (PSA 1), according to an embodiment of the disclosure.

As a process for collecting data of FIG. 8, the operational processes according to an embodiment of the disclosure as described above may be applied.

According to an embodiment of the disclosure, in a first operation, the SMF may request a subscription to data analysis from the NWDAF, and the NWDAF may perform the data analysis and transmit a result to the SMF.

According to an embodiment of the disclosure, in a second operation, the UE may create a PDU session through the UPF (PSA 1) to transmit and receive the data traffic.

According to an embodiment of the disclosure, in a third operation, the NWDAF may analyze load-related data based on collected data.

According to an embodiment of the disclosure, in a fourth operation, when an overload is predicted for a predetermined NF or a predetermined route, the NWDAF may notify the SMF about the analysis data. A function of detecting the need for load diversion may be performed by using an event condition filter, which is transmitted together with the subscription request that is transmitted to the NWDAF from the SMF, or the SMF may directly decide the insertion of the UL CL by periodically receiving the analysis data of the NWDAF.

According to an embodiment of the disclosure, in a fifth operation, the SMF having received the notification about an event may decide the insertion of the UL CL and may determine a configuration value and a location for the insertion of the UL CL. Through this process, the UPF (UL CL) and the UPF (PSA 2) may be selected. The UPF (UP CL) and the UPF (PSA2) may be newly created according to an execution policy or a previous UPF may be selected.

According to an embodiment of the disclosure, in a sixth operation, the SMF may configure the UPF (PSA 2) to support a session.

According to an embodiment of the disclosure, a seventh operation may correspond to an operation of inserting the UPF (UL CL), and in the operation, a traffic rule may be applied to apply a traffic filter by which the UPF (UL CL) diverges to the UPF (PSA 1) and the UPF (PSA 2).

According to an embodiment of the disclosure, an eighth operation may correspond to an operation of applying the traffic rule to configure downlink traffic of the UPF (PSA 1) to pass through the UPF (UL CL). After this process, the traffic entering through the DN may be transmitted to the UE through the UL CL. Uplink traffic coming from the UE may be transmitted to the DN through a route that is the same as a previous route. Next, the SMF may request (R)AN to change the configuration to transmit the uplink to the UL CL. Through this process, the process of inserting the UL CL may be completed. Thereafter, the traffic transmitted from the UE to the DN may diverge in the UL CL to be diverted to the UPF (PSA 1) and the UPF (PSA 2), and the downlink traffic may be merged in the UL CL and transmitted to the UE.

In this process, the session continuity of the traffic diverted to the UPF (PSA 2) may be continually supported through a mobility supporting technique (for example, L3 tunneling, a locator-ID separation protocol (LISP), etc.) of its higher level. It may be different according to an embodiment of the disclosure, in that, when the recommended configuration value is received from the NWDAF, the NWDAF may determine whether or not to insert the UL CL and may transmit the notification message including the object having the configuration value to the SMF as described above. However, the method of basic operations is the same.

Hereinafter, in a situation where the UL CL is already inserted, a method of diverting a load by using the analysis data of the NWDAF is described.

According to an embodiment of the disclosure, when the UL CL is already inserted, a new load diversion rule may be applied, when a network situation is changed after a lapse of time. In this case, a process in which the SMF modifies the UL CL by using the analysis data of the NWDAF for diverting the load is illustrated in FIG. 9.

Figure 9:
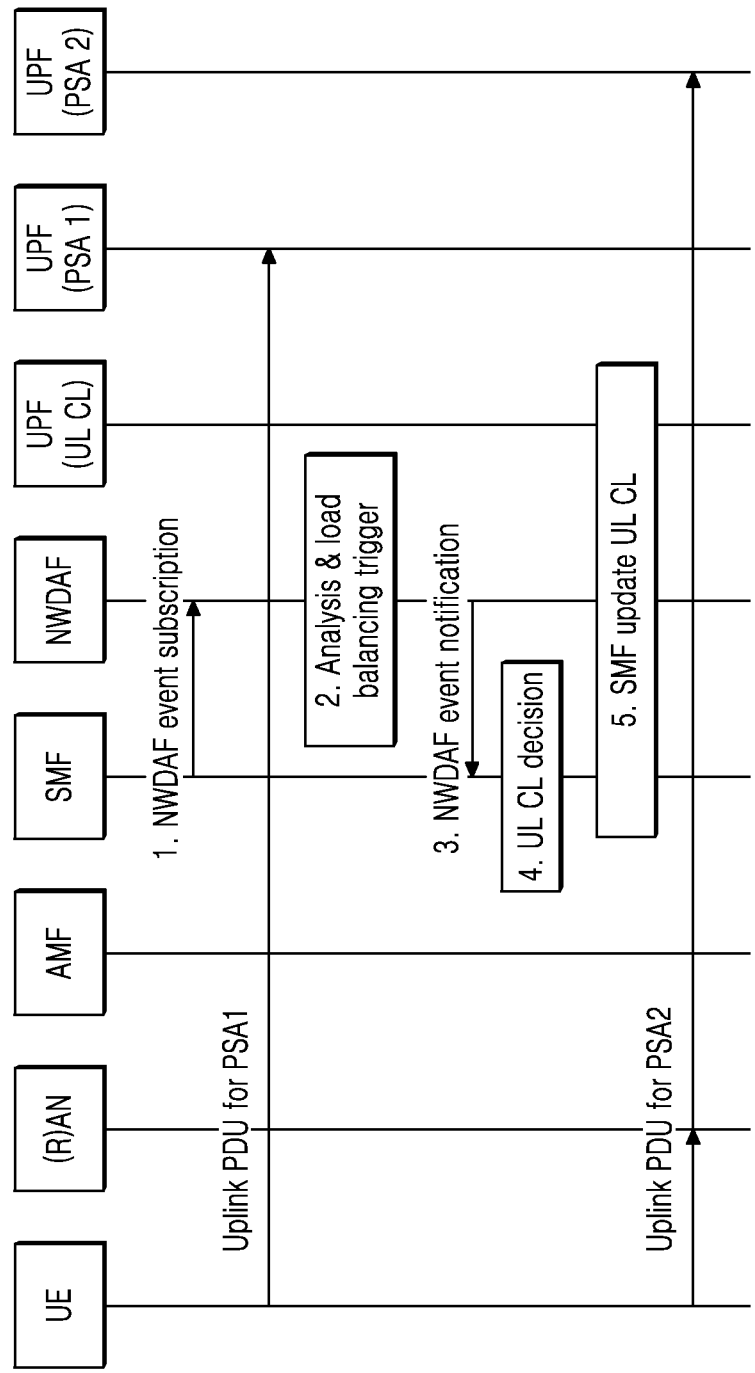
FIG. 9 is a diagram for describing modification of a configuration of a created UL CL and a method performed by an SMF to divert the load by using analysis data of an NWDAF, according to an embodiment of the disclosure.

FIG. 9 is a diagram for describing modification of a configuration of the inserted UL CL and a method performed by the SMF to divert the load by using the analysis data of the NWDAF, according to an embodiment of the disclosure.

In FIG. 9, a process for collecting data is the same as the process described above.

According to an embodiment of the disclosure, in a first operation, the SMF may request a subscription to a data analysis from the NWDAF, and the NWDAF may perform the data analysis and transmit a result to the SMF.

According to an embodiment of the disclosure, a second operation may correspond to an operation in which the NWDAF may analyze load-related data based on the collected data.

According to an embodiment of the disclosure, a third operation may correspond to an operation in which the NWDAF may notify the SMF about analysis data when an overload to a predetermined NF or a route is expected. In the operation of detecting the need for load diversion, an event condition filter that is transmitted together with the subscription request, which is transmitted to the NWDAF from the SMF, may be used. Alternatively, the SMF may periodically receive the analysis data of the NWDAF and may directly decide whether or not to insert the UL CL.

According to an embodiment of the disclosure, a fourth operation may correspond to an operation in which the SMF having received the notification about the event may determine to change the UL CL and determine a configuration value for the insertion of the UL CL.

According to an embodiment of the disclosure, a fifth operation may correspond to an operation of inserting the UPF (UL CL), and a traffic rule may be applied to change a traffic filter by which the UPF (UL CL) may diverge to the UPF (PSA 1) and the UPF (PSA 2).

Thereafter, the traffic transmitted from the UE to the DN may diverge in the UL CL according to a new rule and may be distributed to the UPF (PSA 1) and the UPF (PSA 2). The downlink traffic may be merged in the UL CL and may be transmitted to the UE. In this process, a session continuity of the traffic distributed to the UPF (PSA 2) may be continually supported through a mobility supporting technique (for example, L3 tunneling, an LISP, etc.) of its higher level.

It may be different according to an embodiment of the disclosure, in that, when the recommended configuration value is received from the NWDAF, the NWDAF may determine whether or not to insert the UL CL and may transmit the notification message including the object having the configuration value to the SMF as described above. However, the method of basic operations is the same.

Hereinafter, a method of removing the UL CL by using the analysis data of the NWDAF in order to spare network resources is described.

According to an embodiment of the disclosure, with respect to the inserted UL CL, due to a change in a network or a service situation, there may be a need to remove the UL CL. The change in the situation may also be accommodated through a single route due to a decrease in the number of users or the number of required services. Alternatively, when an overload problem occurring in the NF is solved, the network or the service situation may be changed. In addition, there may be a case in which resources are additionally allocated because of increased devices or an upgrade made to the devices, or there may be a case in which a predetermined PSA has a disorder or does not have to provide services. However, it is not limited to the examples described above.

Figure 10:
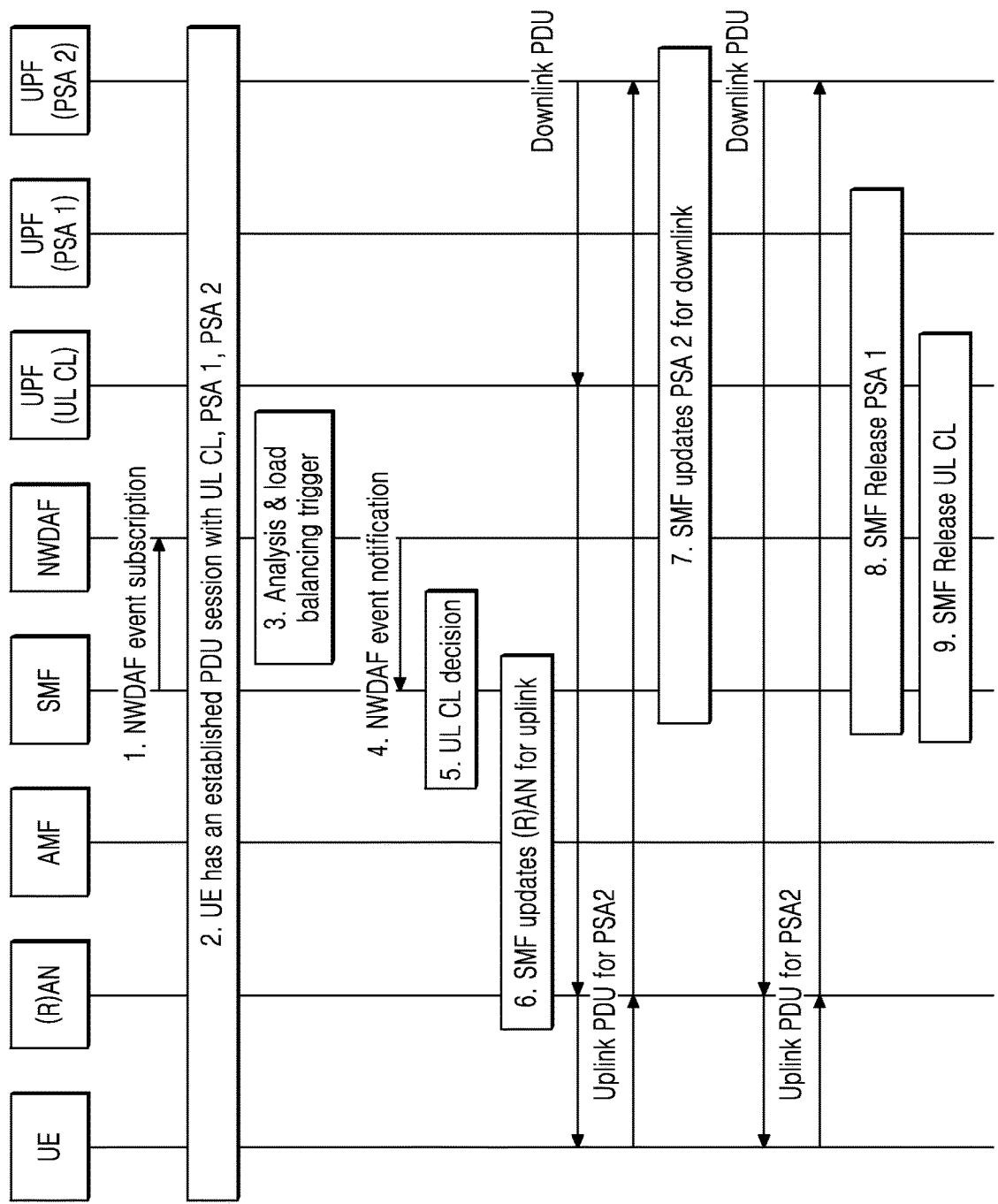
FIG. 10 is a diagram for describing a process of removing a UL CL by using analysis data of an NWDAF, the process being performed by an SMF, according to an embodiment of the disclosure.

FIG. 10 is a diagram of a process in which the SMF removes the UL CL by using the analysis data of the NWDAF.

In detail, FIG. 10 schematizes the process in which the UE removes the UPF (PSA 1) and the UPF (UL CL) and uses only the UPF (PSA 2) and retrieves previously allocated resources, in a situation when the UE transmits and receives data traffic through the UPF (PSA 1), the UPF (PSA 2), and the UPF (UL CL).

For a process for collecting data, the process described with reference to FIG. 8 may be applied.

According to an embodiment of the disclosure, in a first operation, the SMF may request a subscription to a data analysis from the NWDAF, and the NWDAF may perform the data analysis and transmit a result to the SMF.

According to an embodiment of the disclosure, in a second operation, the UE may create a PDU session through the UPF (PSA 1), the UPF (PSA 2), and the UPF (UL CL) and transmit and receive data traffic.

According to an embodiment of the disclosure, a third operation may correspond to an operation in which the NWDAF may analyze load-related data based on the collected data.

According to an embodiment of the disclosure, in a fourth operation, the NWDAF may notify the SMF about the analysis data indicating the need of merging into a predetermined NF or route. With respect to a time point for transmitting the data, an event condition filter, which is transmitted from the SMF to the NWDAF together with the subscription request, may be used. The SMF may periodically receive the analysis data of the NWDAF and may directly decide whether or not to remove the UL CL.

According to an embodiment of the disclosure, in a fifth operation, the SMF having received the event notification may decide to remove the UL CL. Through this operation, the UPF (UL CL) and the UPF (PSA 1) may be selected to be removed.

According to an embodiment of the disclosure, in a sixth operation, the SMF may directly transmit the traffic coming through the UPF (UL CL) to the UPF (PSA 2) by updating (a configuration of an (R)AN. After this process, the traffic toward the UPF (PSA 2) may be directly transmitted to the UPF (PSA 2) without passing through the UL CL.

According to an embodiment of the disclosure, a seventh operation may correspond to an operation of updating a transmission location of the downlink traffic of the UPF (PSA 2) to the (R)AN. Through this process, the traffic using the UPF (PSA 2) may not pass through the UPF (UL CL). Thereafter, the SMF may release the resources assigned to the UPF (PSA 1) and the UPF (UL CL) and may remove the UPF (UL CL) and the UPF (PSA 1) previously inserted.

Hereinafter, a method of inserting the UL CL by using the analysis data of the NWDAF in order to improve the reliability of a network is described, according to an embodiment of the disclosure. To support ultra-reliable low latency communication (URLLC), the network reliability may be improved by transmitting the traffic, which is transmitted from the UE through an uplink, to a destination through another route by copying the traffic. In this process, a receiving end may ignore a repeatedly received packet, or may newly request the packet. To this end, there may be a method of collecting and processing the traffic repeatedly received. Operations of this method may be performed by the receiving end.

An operation according to an embodiment of the disclosure may be substantially the same as the method described with reference to FIG. 8. In the traffic filtering rule of the UL CL that is applied in the seventh operation of FIG. 8, the output traffic may be simultaneously transmitted to the UPF (PSA 1) and the UPF (PSA 2), and thus, the traffic may be duplicated and may be transmitted to the destination.

Hereinafter, a method of using the UL CL by using the analysis data of the NWDAF, in order to control ingress network traffic that is received from an external network, is described.

Generally, there may be a case where it is not possible to control the traffic occurring and entering from an external network. A transmission route may be determined by routing devices located between the external transmitting end and a receiving end. Thus, when a mobile communication network supports multi-homing, it may not be possible to directly control the ingress traffic.

Generally, in a mobile communication network, services may be provided to the UE through a network address translation (NAT) environment. When the mobile communication network initially transmits the traffic to the external network, operations for communicating with the external network may be started. A server located in the external environment may respond to the traffic through a route that is the same as a route of an initial packet that is received. Based on this network characteristics, the route of the ingress traffic may be controlled, in a situation where there are a plurality of UPFs.

According to an embodiment of the disclosure, the insertion/changing/removal of the UL CL may be dynamically applied. By removing the UL CL or changing a traffic filtering rule, an extent of the egress traffic toward a predetermined UPF may be increased, and thus, the ingress traffic toward the predetermined UF may be increased. Here, the extent and the characteristics of the ingress traffic and the egress traffic may be different.

Thus, according to an embodiment of the disclosure, effects of the uplink traffic and the downlink traffic may be analyzed through the NWDAF, it may be analyzed whether the traffics may be accommodated in assigned routes, and the UL CL rules and the creation/modification/removal of the UL CL may be applied.

Hereinafter, according to an embodiment of the disclosure, a method of using the UL CL by using the analysis data of the NWDAF for differentiation of the service quality is described. By changing a network route according to a location of a receiving end located in an external environment, the quality of service may be improved.

For example, in the case of service A, the receiving end may be logically or physically close to the UPF (PSA 1), and thus, a higher quality service may be provided through the UPF (PSA 1) than through the UPF (PSA 2). Similarly, in the case of service B, a higher quality service may be provided through the UPF (PSA 2) than through the UPF (PSA 1).

This aspect may be analyzed by using a pattern of the traffic that is reported from the UPF. By analyzing a delay and an error rate of the transmitted traffic, a pattern of the downlink traffic, round trip time (RTT), and the like in a combined way, the quality of service through an external network route may be indirectly measured. An AF may directly provide feedback about the quality of service and the traffic pattern.

By using this data, the NWDAF may identify the traffics toward the UPF (PSA 1) and the UPF (PSA 2) and may configure the traffic to be transmitted and received through the preferable UPF via the UL CL.

Hereinafter, according to an embodiment of the disclosure, a method of using the UL CL by using the analysis data of the NWDAF for a local network access is described.

For reference, a network which may be used in a predetermined region or a predetermined condition may be referred to as a local access network.

From among 5G mobile communication networks, there may be a local area data network (LA DN). One of the characteristics of the LA DN is that it may be only used under predetermined location or time conditions. Thus, the local access network may be efficiently supported by analyzing a usage pattern of a UE.

When the UE is moved with a predetermined pattern, a predicted route of the UE may be analyzed by the NWDAF, and based on this predicted route, the UL CL for accessing the local access network may be created. When an available local access network is detected on the predicted route of the UE, a traffic filtering rule may be applied for creating the UL CL, so that services provided by the local access network may be provided to the UL CL.

Through the local access network, when the UE is moved to other regions for a predetermined time period, networks in the other regions may be continually used by modifying the UL CL. When the UE is escaped from the service providing region, assigned resources may be retrieved by removing the UL CL.

Figure 11:
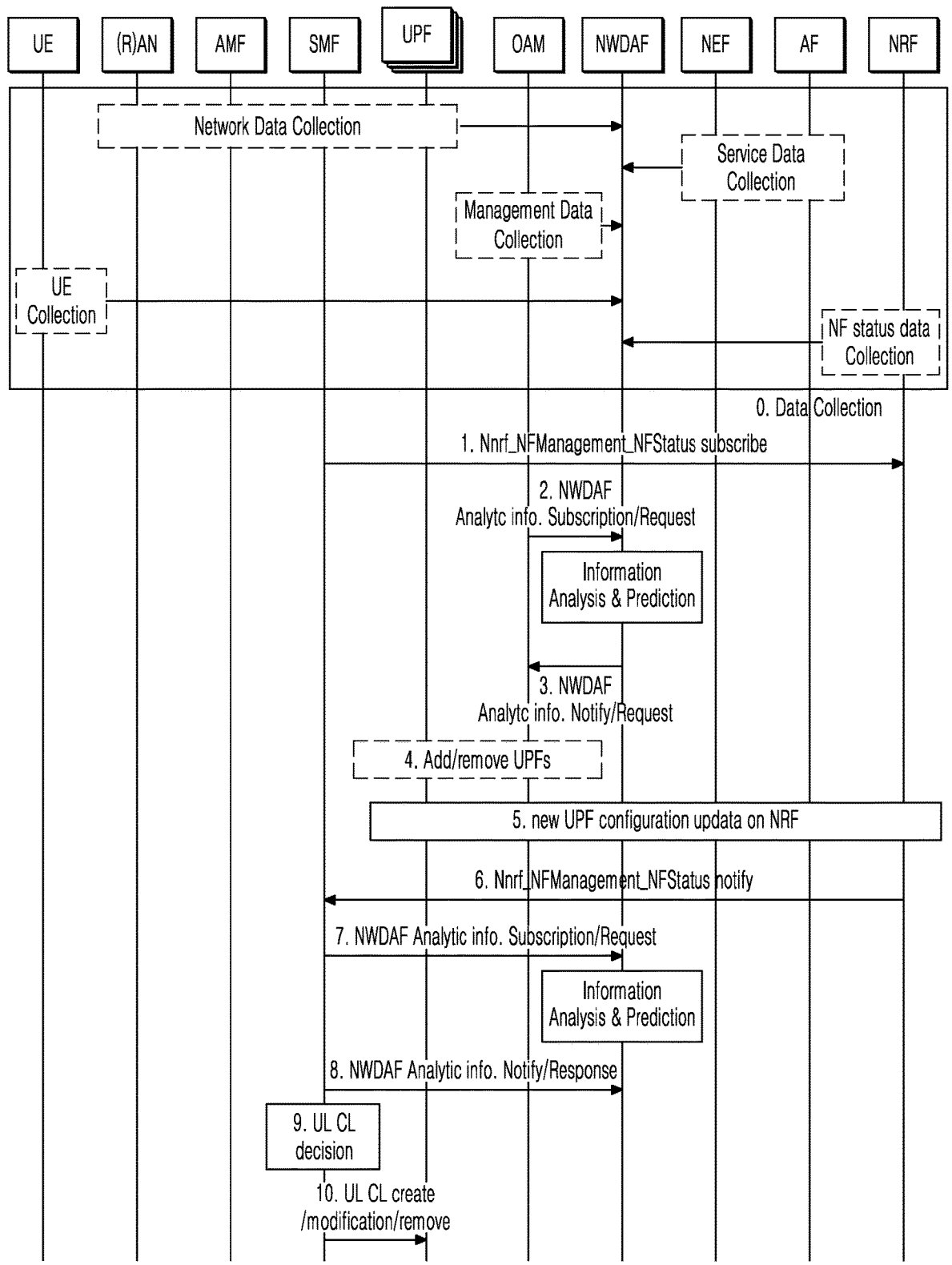
FIG. 11 is a diagram for describing a method of managing a user plane function (UPF) instance, according to an embodiment of the disclosure.

FIG. 11 is a diagram for describing a method of managing a UPF instance, according to an embodiment of the disclosure.

Hereinafter, the UL CL and a BP may generally function as the SMF configures related routing rules in the UPF. Here, in order to support an efficient operation, resources of the UPF, which is an NF performing an actual function when the UL CL and the BP are created, may have to be configured. The physical (or logical) management of the resources of the UPF may be performed by a network managing device located outside a core network, such as an OAM. The network managing device may perform the creation, removal, or modification of the UPF instance and may manage resources for the functions of a CPU, a memory, a storage, etc. assigned to the instance. Thus, the OAM may have to manage the UPF instances by obtaining sufficient resources for efficient operations of the UL CL and the BP.

When there is a deficit in the resources previously allocated to the UPF instances, the OAM may create a new UPF instance or may additionally allocate the resources to the UPF instances. However, the described effects may not be obtained when the architectural shape (UPF topology) of the previous UPF instances may not perform the UL CL or the BP or even when the architectural shape of the previous UPF instances may perform the UL CL or the BP. To improve this situation, the OAM or the network managing device may manage the UPF instance by using traffic-related analysis data and load-related analysis data provided by the NWDAF.

Referring to FIG. 11, a zeroth operation is a basic status before the process is performed and may correspond to an operation in which the NWDAF collects data inputs that are required for performing the analysis function, wherein the NWDAF may collect the data from various entities, such as the NF, the OAM, the UE, and the AF. The data collection may be reactively performed after the NWDAF receives a request for an analysis or after the need for data collection arises.

In a first operation, the SMF may request a subscription to a status of currently available NFs, particularly, UPFs, through a network repository function (NRF). Through this process, UPFs that are newly created or removed may be identified from the NRF.

In a second operation, the OAM may request a subscription to the analysis data about the traffic and the load of the UPF from the NWDAF. Based on the analysis data, the OAM may determine whether or not load statuses of currently executed UPFs and the traffic that has to be processed by the currently operating UPFs at a predetermined time point are at legitimate levels. Here, the OAM may designate a condition with respect to a transmission of the analysis data related to the traffic or the load. For example, by designating a related condition, for example, a load level of the UPF exceeding a predetermined threshold value, traffic that is greater than a threshold value, etc., the analysis data value may be obtained for only a situation designated by the OAM. Moreover, the OAM may periodically subscribe to the analysis data.

In a third operation, the NWDAF may transmit the analysis data related to the traffic and the UPF load to the OAM.

In a fourth operation, the OAM having received the analysis data of the NWDAF may internally execute an analysis, as to whether or not any one of the currently executed UPFs is overloaded, may create a new UPF instance based on a result of the analysis, and may modify a relational configuration of the UPF (the UPF topology). However, the OAM may also remove the UPF, which is not required, when the load or the traffic of the UPF tends to decrease at a predetermined time point.

In a fifth operation, the newly created UPF instance may be directly configured according to an intrinsic rule or may be configured by the OAM. The configuration of the UPF instance may be newly registered in the NRF, or when a previous configuration is modified, the previous configuration may be updated In a sixth operation, the NRF may notify the data about the newly created or updated UPF to the NFs subscribing to the NF Status data, through Nnrf_NFmanagement_NFStatus notify. The notified NFs may recognize that the data about the UPF is modified and may perform a sequential operation based on the updated data.

In a seventh operation, the SMF may request a subscription to the traffic and the load data from the NWDAF.

In an eighth operation, after the NWDAF calculates the requested analysis data, the NWDAF may transmit the data to the SMF. The seventh and eighth operations may be performed separately from the first through fifth operations described above. That is, the seventh and eighth operations may be simultaneously performed with at least one of the first through fifth operations described above, or may be performed before or after the at least one of the first through fifth operations described above.

In a ninth operation, the SMF may create, modify, or remove the UL CL according to a result of the analysis.

In the operations described above, when an AMF-SMF replaces the UPF, for example, when data transmission is performed through a control plane to support Cellular IoT, the NWDAF may transmit the analysis data of the traffic and the load not only through the UPF, but also through the SMF and the AMF. Here, the OAM may add, change, or remove new SMF and AMF instances, and the process described above may be equally applied.

Figure 12:
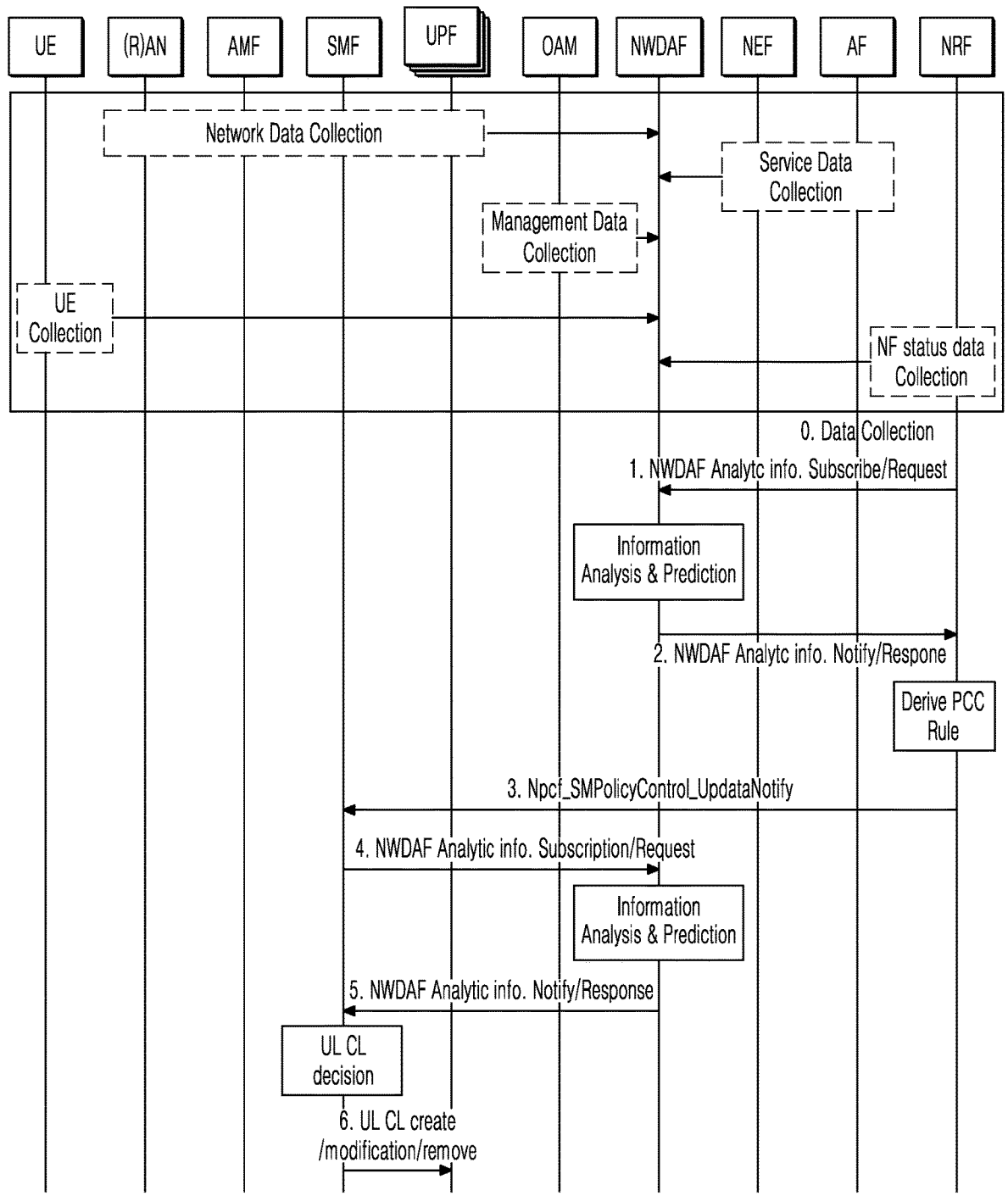
FIG. 12 is a diagram for describing an operation of a point coordination function (PCF), according to an embodiment of the disclosure.

FIG. 12 is a diagram for describing an operation of the PCF, according to an embodiment of the disclosure.

As described below, the PCF may subscribe to the traffic data and the load data of the UPF, provided by the NWDAF, and may establish a policy related to traffic routing or transmission or may create a policy and charging control (PCC) rule to transmit the policy or the PCC rule to the SMF. The PCC rule directly related to the traffic routing may use a predetermined N6 tunnel or transmit the traffic to a DN or a DNAI to satisfy a requirement related to the predetermined N6. Thus, when creating or modifying the UL CL, the SMF may have to be configured to satisfy the requirement of the PCF. That is, the PSAs that may have to be transmitted by the UL CL may be determined according to determination of the PCF. When the PCF notifies the requirement related to the PSA or the N6 or a previous rule has to be changed, a configuration related to the DN may be modified or the PCC rule may be changed based on the analysis data transmitted by the NWDAF, so that the traffic may be induced to be transmitted to the predetermined DN.

Referring to FIG. 12, a zeroth operation is a basic status before the process is performed and may correspond to an operation in which the NWDAF collects data inputs that are required for performing the analysis function, wherein the NWDAF may collect the data from various entities, such as the NF, the OAM, the UE, and the AF. The data collection may be reactively performed after the NWDAF receives a request for an analysis or after the need for data collection arises.

In a first operation, the PCF may request a subscription to analysis data about the traffic and the load of the UPF from the NWDAF. Based on the analysis data, the PCF may determine whether or not load statuses of currently executed UPFs and the traffic that has to be processed by the currently executed UPFs at a predetermined time point are at legitimate levels. Here, the PCF may designate a condition with respect to a transmission of the analysis data related to the traffic or the load. For example, by designating a related condition, for example, a load level of the UPF exceeding a predetermined threshold value, traffic that is greater than a threshold value, etc., the analysis data value may be obtained for only a situation designated by the PCF. Moreover, the PCF may periodically subscribe to the analysis data.

In a second operation, the NWDAF may transmit the analysis data related to the traffic and the UPF load to the OAM.

In a third operation, the PCF receiving the analysis data of the NWDAF may, based on the analysis data, determine whether or not the PCC rules currently transmitted to the SMF may satisfy requirements related to the transmission of predetermined traffic. When it is determined that it may not be possible to satisfy the requirements or it may be possible to optimize the resource or the configuration to satisfy the requirements, the PCF may create new PCC rules and update the rules previously transmitted to the SMF. The operation of the PCF may include creating a new rule, which may be transmitted to a new DN, to satisfy the requirements related to the transmission of the predetermined traffic. The PCF may not allow a transmission of the traffic to a predetermined DN. Also, the PCF may update N6-related rules that may have to be supported by a predetermined N6.

In a fourth operation, the SMF may request a subscription to the traffic and load data from the NWDAF.

In a fifth operation, after the NWDAF calculates the requested analysis data, the NWDAF may transmit information related to the analysis data to the SMF. The fourth and fifth operations may be separate operations from the first through third operations described above and may not be performed in the described order. That is, the fourth and fifth operations may be simultaneously performed with at least one of the first through third operations described above, or may be performed before or after the at least one of the first through third operations described above.

In a sixth operation, the SMF may create, modify, or remove the UL CL according to a result of the analysis.

According to an embodiment of the disclosure,

1) The configurations in the mobile communication core network may not affect the configurations of the UE and the service.

2) The network route may be selected according to the characteristics of an external network, and thus, the quality of service may be differentiated.

3) The ingress and egress traffics between the external environment and the mobile communication network may be indirectly controlled.

4) The internal network resources may be efficiently managed.

5) The local access network or the multi-access edge computing may be supported without an additional specific device or process.

The disclosure relates to a method and a device for managing network data traffic by using a function of collecting and analyzing data and a UL CL in a wireless communication system. According to embodiments of the disclosure, provided are a device and a method for effectively managing the ingress and egress traffics of a data network in a mobile communication system. Also, according to an embodiment of the disclosure, provided are a device and a method for effectively providing services or increasing an efficiency of an execution of a network in a mobile communication system.

Also, according to an embodiment of the disclosure, a method of providing the management of the ingress and egress traffics of a data network in a wireless communication system may include: separating, via an SMF, the traffic through a UL CL by receiving analysis data of factors affecting a status of a data session; and merging two or more sessions.

Figure 13:
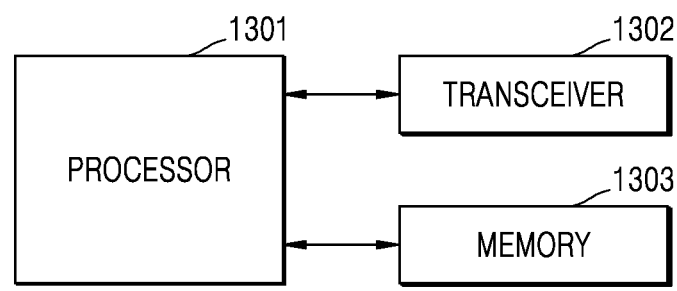
FIG. 13 is a diagram of configurations of a user equipment (UE), according to an embodiment of the disclosure.

FIG. 13 is a diagram of configurations of a UE, according to an embodiment of the disclosure.

Referring to FIG. 13, the UE may include a transmitter and receiver 1302, a memory 1303, and a processor 1301. Based on the communication method of the UE described above, the transmitter and receiver 1302, the memory 1303, and the processor 1301 may operate. However, components of the UE are not limited to the examples described above. For example, the UE may include more or less components than the components described above. Also, the transmitter and receiver 1301, the memory 1303, and the processor 1301 may be realized in the form of a single chip.

The transmitter and receiver 1302 according to an embodiment of the disclosure may transmit and receive signals to and from a base station. Here, the signals may include control information and data. To this end, the transmitter and receiver 1302 may include a radio frequency (RF) transmitter performing upward conversion and amplification on frequencies of transmitted signals and an RF receiver performing low-noise amplification on received signals and performing downward conversion on frequencies. However, this is only an embodiment of the transmitter and receiver 1302. Components of the transmitter and receiver 1302 are not limited to the RF transmitter and the RF receiver.

Also, the transmitter and receiver 1302 according to an embodiment of the disclosure may receive a signal through a wireless channel, output the signal to the processor 1301, and transmit the signal output from the processor 1301 through the wireless channel.

The memory 1303 according to an embodiment of the disclosure may store programs and data required for operations of the UE. Also, the memory 1303 may store control information or data included in the signals obtained from the UE. The memory 1303 may include storage media, such as read-only memory (ROM), random-access memory (RAM), a hard disc, compact disc (CD)-ROM, and digital versatile disc (DVD), or a combination of the storage media. Also, the memory 1303 may include a plurality of memories. According to an embodiment of the disclosure, the memory 1303 may store a program for supporting beam-based cooperative communication.

The processor 1301 according to an embodiment of the disclosure may control a series of processes for the UE to operate according to the embodiment described above. Here, with respect to the operation of the processor 1301, only one or more operations of the embodiment described above are described as examples. However, the operation of the processor 1301 is not limited thereto. The processor 1301 may control all or part of the processes according to the embodiment described above, for the UE to operate.

Figure 14:
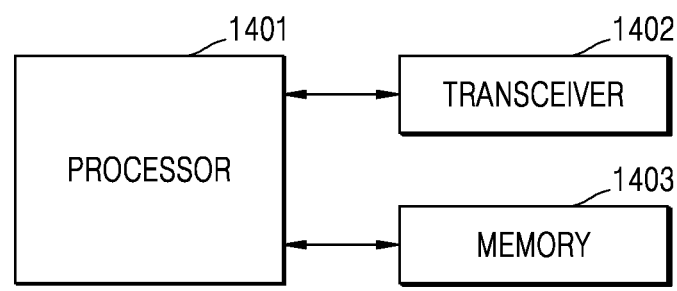
FIG. 14 is a diagram of configurations of a network entity, according to an embodiment of the disclosure.

FIG. 14 is a diagram of configurations of a network entity, according to an embodiment of the disclosure.

Referring to FIG. 14, the network entity may include a transmitter and receiver 1402, a memory 1403, and a processor 1401. Based on the communication method of the network entity described above, the transmitter and receiver 1402, the memory 1403, and the processor 1401 may operate. However, components of the network entity are not limited to the examples described above. For example, the network entity may include more or less components than the components described above. Also, the transmitter and receiver 1402, the memory 1403, and the processor 1401 may be realized in the form of a single chip. According to an embodiment of the disclosure, the network entity may include a base station and an entity included in a core network. The network entity may include the NFs (the network functions) described above and may include, for example, an AMF, an SMF, etc.

The transmitter and receiver 1402 may transmit and receive signals between the UE, the network entity, or the base station. Here, the signals may include control information and data. To this end, the transmitter and receiver 1402 may include an RF transmitter performing upward conversion and amplification on frequencies of transmitted signals and an RF receiver performing low-noise amplification on received signals and performing downward conversion on frequencies. However, this is only an embodiment of the transmitter and receiver 1402. Components of the transmitter and receiver 1402 are not limited to the RF transmitter and the RF receiver.

Also, the transmitter and receiver 1402 according to an embodiment of the disclosure may receive a signal through a wireless channel, output the signal to the processor 1401, and transmit the signal output from the processor 1401 through the wireless channel.

The memory 1403 according to an embodiment of the disclosure may store programs and data required for operations of the network entity. Also, the memory 1403 may store control information or data included in the signals obtained from the network entity. The memory 1403 may include storage media, such as ROM, RAM, a hard disc, CD-ROM, and DVD, or a combination of the storage media. Also, the memory 1403 may include a plurality of memories. According to an embodiment of the disclosure, the memory 1403 may store a program for supporting beam-based cooperative communication.

The processor 1401 according to an embodiment of the disclosure may control a series of processes for the UE to operate according to the embodiment described above. According to one or more embodiments, the network entity may transmit a request for available analysis data to an NWDAF and may receive a response including the available analysis data from the NWDAF. The processor 1401 may perform only one or more operations of the embodiment described above. However, operations of the processor 1401 are not limited thereto. The processor 1401 may control all or part of the processes according to the embodiment described above, for the network entity to operate.

The methods according to the embodiments described in the claims or the specification of the disclosure may be implemented by hardware, software, or by a combination of hardware and software.

When the methods are implemented by software, a computer-readable recording medium or a computer program product storing one or more programs (software modules) may be provided. The one or more programs stored in the computer-readable recording medium or the computer program product may be configured to be executed via one or more processors in an electronic device. The one or more programs may include instructions for the electronic device to execute the methods according to the embodiments described in the claims and the specification of the disclosure.

The programs (software modules or software) may be stored in non-volatile memories including RAM, flash memory, etc., ROM, electrically erasable programmable ROM (EEPROM), a magnetic disc storage device, CD-ROM, DVDs other optical storage devices, or magnetic cassettes. Alternatively, the programs may be stored in a memory composed of part or all of the memories described above. Also, each of the memories included in the memory may be provided in a multiple number.

Also, the programs may be stored in an attachable storage device, which may be accessed through a communication network, such as the Internet, the Intranet, a local area network (LAN), a wide LAN (WLAN), or a storage area network (SAN), or through a communication network combining the communication networks described above. The storage device may access a device configured to perform the embodiment of the disclosure through an external port. Also, an additional storage device on a communication network may access the device configured to perform the embodiment of the disclosure.

With respect to the detailed embodiments of the disclosure described above, the components included in the disclosure are referred to by a singular term or a plural term according to the provided detailed embodiments. However, the singular term or the plural term may be appropriately selected according to situations that are provided, for convenience of explanation. The disclosure is not limited to the singular components or the plural components. A component referred to by the plural term may be configured as a single component, and a component referred to by the singular term may be configured as a plurality of component.

The embodiments disclosed in the specification and the drawings may provide examples for easily explaining the technical concept of the disclosure and helping understand the disclosure and may not limit the scope of the disclosure. That is, it would be obvious to one of ordinary skill in the art that other modified examples are possible based on the technical concept of the disclosure. Also, each embodiment may be executed in combination with another embodiment according to necessity. For example, portions of an embodiment and another embodiment of the disclosure may be combined. Also, the embodiments may be modified based on the technical concept of the disclosure so as to be applied to other systems, for example, an LTE system, a 5G system, or an NR system.

The invention claimed is:

1. A method, performed by an entity associated with a session management function (SMF) in a wireless communication system, the method comprising:
  receiving, from an entity associated with a network data analytics function (NWDAF), analysis information; and
  selecting, based on processing a duration time, a periodic time, a start time, and a traffic volume of a user equipment (UE) communication, and analytics for a user plane function (UPF) load included in the analysis information, at least one entity associated with the UPF for an uplink classification function and a protocol data unit (PDU) session anchor.

2. The method of claim 1, further comprising:
  determining to insert in a data path an uplink classifier (UL CL), and
  wherein the UL CL the uplink classification function supported by one of the at least one entity associated with the UPF.

3. The method of claim 2, wherein the UL CL applies a traffic filtering rule and determines how data is routed.

4. A method, performed by an entity associated with a Network Data Analytics Function (NWDAF) in a wireless communication system, the method comprising:
  receiving first data associated with a network function (NF) load and a user equipment (UE); and
  transmitting, to an entity associated with a session management function (SMF), second data including a duration time, a periodic time, a start time, and a traffic volume of a UE communication, and analytics for the NF load, and
  wherein the second data is processed, by the entity associated with the SMF, for selecting an entity associated with a user plane function (UPF) for an uplink classification function and a protocol data unit (PDU) session anchor.

5. The method of claim 4, wherein the first data comprises information on at least one of data network name (DNN), traffic usage report or an application ID, and
  wherein the information is provided by at least one of a user plane function (UPF), a session management function (SMF), or an application function (AF).

6. The method of claim 4, wherein the analytics for the NF load comprises information on at least one of NF status, mapping of network resources, or NF load.

7. An entity associated with a session management function (SMF) in a wireless communication system, the entity comprising:
  a transceiver; and
  at least one processor connected with the transceiver and configured to:
    receive, from an entity associated with a network data analytics function (NWDAF), analysis information based on analytics for user plane function (UPF) load and analytics for a user equipment (UE), and
  select, based on processing a duration time, a periodic time, a start time, and a traffic volume of a user equipment (UE) communication, and analytics for UPF load included in the analysis information, at least one entity associated with the UPF for an uplink classification function and a protocol data unit (PDU) session anchor.

8. The entity of claim 7, wherein the at least one processor is further configured to determine to insert in a data path an uplink classifier (UL CL), and
  wherein the UL CL is the uplink classification function supported by at least one UPF.

9. The entity of claim 8, wherein the UL CL applies a traffic filtering rule and determines how data is routed.

10. An entity associated with a Network Data Analytics Function (NWDAF) in a wireless communication system, the entity comprising:
  a transceiver; and
  at least one processor connected with the transceiver and configured to:
    receive first data associated with a network function (NF) load and a user equipment (UE), and
    transmit, to an entity associated with session management function (SMF), second data including a duration time, a periodic time, a start time, and a traffic volume of a UE communication, and analytics for the NF load, and
  wherein the second data is processed, by the entity associated with the SMF, for selecting an entity associated with a user plane function (UPF) for an uplink classification function and a protocol data unit (PDU) session anchor.

11. The entity of claim 10, wherein the first data comprises information on at least one of data network name (DNN), traffic usage report or an application ID, and
  wherein the information is provided by at least one of a user plane function (UPF), a session management function (SMF), or an application function (AF).

* * * * *